United States Patent
Chen et al.

(10) Patent No.: US 12,189,094 B2
(45) Date of Patent: Jan. 7, 2025

(54) MOBILE DEVICE AND OPTICAL IMAGING LENS THEREOF

(71) Applicant: Genius Electronic Optical Co., Ltd., Taichung (TW)

(72) Inventors: Shih Han Chen, Taichung (TW); Junguang Zhang, Xiamen (CN); Lai Shu Cao, Xiamen (CN)

(73) Assignee: Genius Electronic Optical Co., Ltd., Taichung (TW)

( * ) Notice: Subject to any disclaimer, the term of this patent is extended or adjusted under 35 U.S.C. 154(b) by 0 days.

(21) Appl. No.: 18/424,151

(22) Filed: Jan. 26, 2024

(65) Prior Publication Data

US 2024/0264409 A1 Aug. 8, 2024

Related U.S. Application Data

(63) Continuation of application No. 18/128,436, filed on Mar. 30, 2023, now Pat. No. 11,921,263, which is a continuation of application No. 17/677,131, filed on Feb. 22, 2022, now Pat. No. 11,644,652, which is a continuation of application No. 16/852,242, filed on Apr. 17, 2020, now Pat. No. 11,294,150, which is a continuation of application No. 15/652,569, filed on Jul. 18, 2017, now Pat. No. 10,678,023, which is a continuation of application No. 14/795,801, filed on Jul. 9, 2015, now Pat. No. 9,746,639, which is a continuation of application No. 13/963,717, filed on Aug. 9, 2013, now Pat. No. 9,097,876.

(30) Foreign Application Priority Data

May 3, 2013 (CN) .......................... 201310159899.7

(51) Int. Cl.
*G02B 13/00* (2006.01)
*G02B 9/62* (2006.01)
*G02B 13/04* (2006.01)
*G02B 27/00* (2006.01)

(52) U.S. Cl.
CPC .......... *G02B 13/0045* (2013.01); *G02B 9/62* (2013.01); *G02B 13/04* (2013.01); *G02B 27/0025* (2013.01)

(58) Field of Classification Search
CPC ...... G02B 13/0045; G02B 9/62; G02B 13/04; G02B 27/0025
See application file for complete search history.

(56) References Cited

U.S. PATENT DOCUMENTS

2013/0003193 A1* 1/2013 Huang ............... G02B 13/0045
359/713

\* cited by examiner

*Primary Examiner* — James C. Jones
(74) *Attorney, Agent, or Firm* — Kilpatrick Townsend & Stockton LLP

(57) ABSTRACT

An optical imaging lens includes six lens elements. The object-side surface of the second lens element comprises a convex portion in a vicinity of a periphery, the third lens element has positive refractive power and the image-side surface comprises a convex portion in a vicinity of a periphery, the image-side surface of the fifth lens element comprises a convex portion in a vicinity of an optical axis, and the image-side surface of the sixth lens element comprises a concave portion in a vicinity of an optical axis and a convex portion in a vicinity of a periphery. The optical imaging lens as a whole has only the six lens elements. A distance from the object-side surface of the first lens element to the image-side surface of the sixth lens element is TL, a central thickness of the sixth lens element along the optical axis is CT6, and 7.6≤TL/CT6.

20 Claims, 24 Drawing Sheets

| \multicolumn{8}{c}{f(Focus)= 4.060725mm, HFOV (Half angular field of view)=38.183deg., System length= 5.273mm, Fno= 2.03, Image hieght= 3.185mm} |
|---|---|---|---|---|---|---|---|

| Surface # | | Radius | Thickness | Refractive index | Abbe number | Material | Focus |
|---|---|---|---|---|---|---|---|
| - | Object | ∞ | ∞ | | | | |
| 100 | Aperture stop | ∞ | -0.25 | | | | |
| 111 | 1st lens element | 1.793234 | 0.6944795 | 1.544102 | 56.1143 | plastic | 3.393 |
| 112 | | 48.49458 | 0.0778914 | | | | |
| 121 | 2nd lens element | 6.066544 | 0.2381979 | 1.6398 | 23.2654 | plastic | -6.806 |
| 122 | | 2.505813 | 0.5154262 | | | | |
| 131 | 3rd lens element | 28.9196 | 0.3143977 | 1.544102 | 56.1143 | plastic | 38.077 |
| 132 | | -73.65046 | 0.0959729 | | | | |
| 141 | 4th lens element | -3.463927 | 0.8594999 | 1.544102 | 56.1143 | plastic | 2.866 |
| 142 | | -1.172187 | 0.0968123 | | | | |
| 151 | 5th lens element | -7.762719 | 0.489115 | 1.544102 | 56.1143 | plastic | -14.98 |
| 152 | | -156.1709 | 0.1466243 | | | | |
| 161 | 6th lens element | -125.4483 | 0.3868271 | 1.544102 | 56.1143 | plastic | -3.546 |
| 162 | | 1.968421 | 0.45 | | | | |
| 171 | IR cut filter | ∞ | 0.3 | | | | |
| 172 | | ∞ | 0.6078067 | | | | |
| 180 | Image plane | ∞ | | | | | |

FIG. 4

| Aspherical parameters | | | | | | |
|---|---|---|---|---|---|---|
| Surface # | 111 | 112 | 121 | 122 | 131 | 132 |
| K | -6.19E+00 | 0.00E+00 | 0.00E+00 | -1.16E+01 | 0.00E+00 | 0.00E+00 |
| $a_4$ | 1.29E-01 | -6.59E-02 | -1.32E-01 | 2.80E-02 | -1.03E-01 | -8.10E-02 |
| $a_6$ | -4.73E-02 | 1.17E-01 | 2.80E-01 | 9.44E-02 | 3.32E-02 | -1.44E-02 |
| $a_8$ | -1.76E-03 | -1.41E-01 | -5.08E-01 | -1.22E-01 | -1.18E-01 | -2.01E-02 |
| $a_{10}$ | 1.01E-02 | 4.06E-02 | 7.28E-01 | 8.01E-02 | 1.08E-01 | 1.78E-02 |
| $a_{12}$ | 5.78E-03 | | -8.06E-01 | 1.89E-02 | -3.60E-02 | |
| $a_{14}$ | -1.14E-02 | | 5.01E-01 | -7.88E-02 | | |
| $a_{16}$ | | | -1.18E-01 | 4.30E-02 | | |
| Surface # | 141 | 142 | 151 | 152 | 161 | 162 |
| K | 1.86E+00 | -6.91E-01 | -2.14E+02 | 6.36E+02 | 0.00E+00 | -8.87E+00 |
| $a_4$ | -1.97E-02 | 1.31E-01 | -3.07E-02 | -2.51E-02 | -8.98E-02 | -7.05E-02 |
| $a_6$ | 1.41E-02 | -9.34E-02 | -3.83E-03 | -4.81E-04 | 7.22E-02 | 4.31E-02 |
| $a_8$ | 2.82E-02 | 8.54E-02 | 2.75E-03 | -2.19E-04 | -3.92E-02 | -1.99E-02 |
| $a_{10}$ | -8.63E-03 | -2.68E-02 | -6.75E-04 | 1.04E-04 | 1.32E-02 | 6.11E-03 |
| $a_{12}$ | -9.53E-04 | 2.61E-03 | -1.28E-04 | 1.04E-05 | -2.54E-03 | -1.23E-03 |
| $a_{14}$ | | | 4.97E-05 | -1.82E-06 | 2.58E-04 | 1.54E-04 |
| $a_{16}$ | | | | | -1.08E-05 | -1.08E-05 |
| $a_{18}$ | | | | | | 3.17E-07 |

FIG. 5

| | f(Focus)= 4.217011mm, HFOV (Half angular field of view)= 37.092deg., System length= 5.358mm, Fno= 2.22, Image hieght= 3.185mm |
|---|---|---|---|---|---|---|---|
| Surface # | | Radius | Thickness | Refractive index | Abbe number | Material | Focus |
| - | Object | ∞ | ∞ | | | | |
| 200 | Aperture stop | ∞ | -0.25 | | | | |
| 211 | 1st lens element | 1.759267 | 0.7020377 | 1.544102 | 56.1143 | plastic | 3.381 |
| 212 | | 32.19119 | 0.075119 | | | | |
| 221 | 2nd lens element | 5.221959 | 0.2381979 | 1.650405 | 21.6666 | plastic | -7.268 |
| 222 | | 2.446711 | 0.4628343 | | | | |
| 231 | 3rd lens element | -43.69511 | 0.3143977 | 1.534524 | 55.6345 | plastic | 56.785 |
| 232 | | -100.2408 | 0.1646705 | | | | |
| 241 | 4th lens element | -3.049009 | 0.8642679 | 1.534524 | 55.6345 | plastic | 2.995 |
| 242 | | -1.15621 | 0.0991543 | | | | |
| 251 | 5th lens element | -6.942148 | 0.5254551 | 1.650405 | 21.6666 | plastic | -17.327 |
| 252 | | -18.3808 | 0.1844057 | | | | |
| 261 | 6th lens element | -323.1846 | 0.3984106 | 1.534524 | 55.6345 | plastic | -602.626 |
| 262 | | 1.827169 | 0.45 | | | | |
| 271 | IR cut filter | ∞ | 0.3 | | | | |
| 272 | | ∞ | 0.579539 | | | | |
| 280 | Image plane | ∞ | | | | | |

FIG. 8

| Aspherical parameters | | | | | | |
|---|---|---|---|---|---|---|
| Surface # | 211 | 212 | 221 | 222 | 231 | 232 |
| K | -6.03E+00 | 0.00E+00 | 0.00E+00 | -1.24E+01 | 0.00E+00 | 0.00E+00 |
| $a_4$ | 1.28E-01 | -7.10E-02 | -1.29E-01 | 3.65E-02 | -1.13E-01 | -8.41E-02 |
| $a_6$ | -4.68E-02 | 1.17E-01 | 2.83E-01 | 9.52E-02 | 3.29E-02 | -1.12E-02 |
| $a_8$ | -1.46E-03 | -1.41E-01 | -5.07E-01 | -1.19E-01 | -1.18E-01 | -1.68E-02 |
| $a_{10}$ | 8.63E-03 | 4.11E-02 | 7.29E-01 | 8.05E-02 | 1.13E-01 | 2.01E-02 |
| $a_{12}$ | 5.78E-03 | | -8.05E-01 | 1.75E-02 | -3.21E-02 | 0.00E+00 |
| $a_{14}$ | -1.15E-02 | | 5.01E-01 | -7.93E-02 | 0.00E+00 | 0.00E+00 |
| $a_{16}$ | | | -1.19E-01 | 4.56E-02 | 0.00E+00 | 0.00E+00 |
| Surface # | 241 | 242 | 251 | 252 | 261 | 262 |
| K | 1.16E+00 | -6.89E-01 | -1.25E+02 | 3.39E+01 | 0.00E+00 | -8.14E+00 |
| $a_4$ | -1.66E-02 | 1.30E-01 | -3.02E-02 | -1.42E-02 | -9.09E-02 | -7.20E-02 |
| $a_6$ | 1.35E-02 | -9.32E-02 | -2.22E-03 | -2.76E-03 | 7.18E-02 | 4.30E-02 |
| $a_8$ | 2.80E-02 | 8.52E-02 | 2.38E-03 | -7.92E-05 | -3.92E-02 | -1.99E-02 |
| $a_{10}$ | -9.05E-03 | -2.72E-02 | -8.44E-04 | 1.18E-04 | 1.32E-02 | 6.11E-03 |
| $a_{12}$ | -1.47E-03 | 2.61E-03 | -1.32E-04 | 1.11E-05 | -2.54E-03 | -1.23E-03 |
| $a_{14}$ | 0.00E+00 | 0.00E+00 | 6.41E-05 | -2.29E-06 | 2.58E-04 | 1.54E-04 |
| $a_{16}$ | 0.00E+00 | 0.00E+00 | 0.00E+00 | | -1.09E-05 | -1.08E-05 |
| $a_{18}$ | | | | | | 3.19E-07 |

FIG. 9

| f(Focus)= 4.559474mm, HFOV (Half angular field of view)=34.641deg., System length= 5.358mm, Fno= 2.28, Image hieght= 3.185mm ||||||||
|---|---|---|---|---|---|---|---|
| Surface # | | Radius | Thickness | Refractive index | Abbe number | Material | Focus |
| - | Object | ∞ | ∞ | | | | |
| 300 | Aperture stop | ∞ | -0.28 | | | | |
| 311 | 1st lens element | 1.66991 | 0.7431658 | 1.544102 | 56.1143 | plastic | 2.66 |
| 312 | | -9.386975 | 0.0788638 | | | | |
| 321 | 2nd lens element | -7.996613 | 0.25 | 1.639729 | 23.5288 | plastic | -4.819 |
| 322 | | 5.142347 | 0.6519957 | | | | |
| 331 | 3rd lens element | -12.09949 | 0.5098736 | 1.544102 | 56.1143 | plastic | 12.97 |
| 332 | | -4.533359 | 0.142429 | | | | |
| 341 | 4th lens element | -1.35288 | 0.3304025 | 1.639729 | 23.5288 | plastic | -108.117 |
| 342 | | -1.511725 | 0.3041611 | | | | |
| 351 | 5th lens element | 5.33881 | 0.7422833 | 1.544102 | 56.1143 | plastic | 4.516 |
| 352 | | -4.355179 | 0.1452395 | | | | |
| 361 | 6th lens element | -3.280075 | 0.3947777 | 1.544102 | 56.1143 | plastic | -2.452 |
| 362 | | 2.357732 | 0.5 | | | | |
| 371 | IR cut filter | ∞ | 0.3 | | | | |
| 372 | | ∞ | 0.2650725 | | | | |
| 380 | Image plane | ∞ | | | | | |

FIG. 12

| Aspherical parameters | | | | | | |
|---|---|---|---|---|---|---|
| Surface # | 311 | 312 | 321 | 322 | 331 | 332 |
| K | 0.00E+00 | 0.00E+00 | 0.00E+00 | 1.75E+01 | -2.23E+02 | -1.04E+02 |
| $a_4$ | 3.42E-03 | 5.24E-02 | 9.82E-02 | 4.79E-02 | -1.53E-01 | -2.57E-01 |
| $a_6$ | -1.30E-02 | -3.06E-02 | -6.69E-02 | -1.80E-02 | 3.21E-02 | 2.87E-01 |
| $a_8$ | 2.11E-02 | -4.82E-03 | 3.33E-02 | 1.11E-02 | -4.67E-03 | -1.69E-01 |
| $a_{10}$ | 4.78E-03 | -1.61E-03 | -8.61E-03 | 1.57E-02 | -3.84E-02 | 1.53E-02 |
| $a_{12}$ | -5.68E-02 | -4.93E-03 | -1.21E-02 | -1.97E-02 | 2.39E-02 | 8.98E-03 |
| $a_{14}$ | 5.99E-02 | | 9.63E-03 | 1.76E-02 | | |
| $a_{16}$ | -2.30E-02 | | | | | |
| Surface # | 341 | 342 | 351 | 352 | 361 | 362 |
| K | -6.35E+00 | -2.11E+00 | 2.14E-01 | 0.00E+00 | 0.00E+00 | -1.47E+01 |
| $a_4$ | -1.04E-01 | 7.54E-02 | -7.61E-02 | 3.20E-02 | -6.27E-03 | -3.23E-02 |
| $a_6$ | 2.18E-01 | -4.47E-02 | 1.03E-02 | -1.52E-02 | 5.01E-03 | 6.34E-03 |
| $a_8$ | -1.20E-01 | 1.39E-02 | -6.34E-03 | 1.49E-03 | -2.44E-04 | -1.35E-03 |
| $a_{10}$ | -2.41E-02 | -1.21E-03 | 5.90E-04 | | 0.00E+00 | 1.25E-04 |
| $a_{12}$ | 3.34E-02 | 1.02E-04 | 1.23E-04 | | 0.00E+00 | 3.86E-06 |
| $a_{14}$ | -5.08E-03 | | 2.65E-05 | | 0.00E+00 | -1.58E-06 |
| $a_{16}$ | -1.00E-03 | | -2.88E-06 | | 0.00E+00 | 9.43E-08 |
| $a_{18}$ | | | | | | |

FIG. 13

| f(Focus)=4.131843mm, HFOV (Half angular field of view)=37.574deg., System length= 5.355mm, Fno= 2.09, Image hieght= 3.185mm ||||||||
|---|---|---|---|---|---|---|---|
| Surface # | | Radius | Thickness | Refractive index | Abbe number | Material | Focus |
| - | Object | ∞ | ∞ | | | | |
| 400 | Aperture stop | ∞ | -0.25 | | | | |
| 411 | 1st lens element | 1.935101 | 0.7407463 | 1.544102 | 56.1143 | plastic | 3.22 |
| 412 | | -16.57886 | 0.1836279 | | | | |
| 421 | 2nd lens element | -32.93233 | 0.2348802 | 1.639729 | 23.5288 | plastic | -4.22 |
| 422 | | 2.973647 | 0.2358569 | | | | |
| 431 | 3rd lens element | 4.646922 | 0.4015336 | 1.544102 | 56.1143 | plastic | 7.042 |
| 432 | | -21.58797 | 0.394216 | | | | |
| 441 | 4th lens element | -1.666023 | 0.6155505 | 1.544102 | 56.1143 | plastic | 3.309 |
| 442 | | -0.979773 | 0.1420883 | | | | |
| 451 | 5th lens element | -4.332519 | 0.6274499 | 1.544102 | 56.1143 | plastic | 14.511 |
| 452 | | -2.944073 | 0.0641023 | | | | |
| 461 | 6th lens element | -11.30675 | 0.3985803 | 1.544102 | 56.1143 | plastic | -2.359 |
| 462 | | 1.471292 | 0.5 | | | | |
| 471 | IR cut filter | ∞ | 0.3 | | | | |
| 472 | | ∞ | 0.5167426 | | | | |
| 480 | Image plane | ∞ | | | | | |

FIG. 16

| Aspherical parameters | | | | | | |
|---|---|---|---|---|---|---|
| Surface # | 411 | 412 | 421 | 422 | 431 | 432 |
| K | 0.00E+00 | 0.00E+00 | 0.00E+00 | 0.00E+00 | 0.00E+00 | 0.00E+00 |
| $a_4$ | -1.15E-02 | 1.36E-02 | 2.36E-03 | -4.54E-02 | -9.82E-02 | -4.77E-02 |
| $a_6$ | 4.06E-02 | 1.70E-02 | 4.57E-02 | 7.87E-02 | 2.81E-02 | 1.96E-02 |
| $a_8$ | -8.40E-02 | -9.07E-02 | -1.23E-01 | -7.72E-02 | | |
| $a_{10}$ | 7.58E-02 | 5.35E-02 | 5.58E-02 | 3.05E-02 | | |
| $a_{12}$ | -3.24E-02 | -1.49E-02 | | | | |
| $a_{14}$ | | | | | | |
| $a_{16}$ | | | | | | |
| Surface # | 441 | 442 | 451 | 452 | 461 | 462 |
| K | 0.00E+00 | -8.99E-01 | 0.00E+00 | 0.00E+00 | 0.00E+00 | -7.47E+00 |
| $a_4$ | -3.04E-02 | 1.53E-01 | 8.82E-02 | 6.33E-02 | -6.64E-02 | -6.54E-02 |
| $a_6$ | 1.19E-01 | -1.03E-01 | -5.60E-02 | -3.23E-02 | 1.75E-02 | 2.39E-02 |
| $a_8$ | -3.55E-02 | 8.38E-02 | 9.47E-03 | 7.78E-03 | 4.20E-04 | -6.55E-03 |
| $a_{10}$ | -3.62E-03 | -3.59E-02 | -2.73E-04 | -6.63E-04 | -6.69E-04 | 1.03E-03 |
| $a_{12}$ | 2.34E-03 | 6.65E-03 | | | 8.98E-05 | -8.68E-05 |
| $a_{14}$ | | | | | -3.87E-06 | 3.12E-06 |
| $a_{16}$ | | | | | | |
| $a_{18}$ | | | | | | |

FIG. 17

| f(Focus)= 4.216234mm , HFOV (Half angular field of view)=37.095deg., System length= 5.357mm, Fno= 2.23, Image hieght= 3.185mm |||||||
|---|---|---|---|---|---|---|---|
| Surface # | | Radius | Thickness | Refractive index | Abbe number | Material | Focus |
| - | Object | ∞ | ∞ | | | | |
| 500 | Aperture stop | ∞ | -0.24 | | | | |
| 511 | 1st lens element | 1.81622 | 0.6536486 | 1.544102 | 56.1143 | plastic | 3.388 |
| 512 | | 88.15941 | 0.0814124 | | | | |
| 521 | 2nd lens element | 6.614842 | 0.3057016 | 1.650405 | 21.6666 | plastic | -6.538 |
| 522 | | 2.553693 | 0.454824 | | | | |
| 531 | 3rd lens element | 232.6608 | 0.5252741 | 1.534524 | 55.6345 | plastic | 34.237 |
| 532 | | -19.91832 | 0.2674074 | | | | |
| 541 | 4th lens element | -2.335432 | 0.5142584 | 1.534524 | 55.6345 | plastic | 3.693 |
| 542 | | -1.154011 | 0.0862361 | | | | |
| 551 | 5th lens element | -8.071558 | 0.4241674 | 1.650405 | 21.6666 | plastic | -29.638 |
| 552 | | -14.09249 | 0.4159712 | | | | |
| 561 | 6th lens element | -66.06479 | 0.5324689 | 1.534524 | 55.6345 | plastic | -3.53 |
| 562 | | 1.95467 | 0.45 | | | | |
| 571 | IR cut filter | ∞ | 0.3 | | | | |
| 572 | | ∞ | 0.3457052 | | | | |
| 580 | Image plane | ∞ | | | | | |

FIG. 20

| Aspherical parameters | | | | | | |
|---|---|---|---|---|---|---|
| Surface # | 511 | 512 | 521 | 522 | 531 | 532 |
| K | -6.60E+00 | 0.00E+00 | 0.00E+00 | -1.46E+01 | 0.00E+00 | 0.00E+00 |
| $a_4$ | 1.28E-01 | -6.71E-02 | -1.30E-01 | 2.38E-02 | -1.16E-01 | -8.07E-02 |
| $a_6$ | -4.81E-02 | 1.24E-01 | 2.87E-01 | 8.96E-02 | 5.47E-02 | -3.75E-03 |
| $a_8$ | -2.53E-03 | -1.40E-01 | -5.01E-01 | -1.17E-01 | -1.23E-01 | -2.02E-02 |
| $a_{10}$ | 9.24E-03 | 4.02E-02 | 7.30E-01 | 8.51E-02 | 1.09E-01 | 1.20E-02 |
| $a_{12}$ | 6.63E-03 | | -8.05E-01 | 2.00E-02 | -3.54E-02 | 0.00E+00 |
| $a_{14}$ | -1.17E-02 | | 5.00E-01 | -7.99E-02 | 0.00E+00 | 0.00E+00 |
| $a_{16}$ | | | -1.20E-01 | 4.12E-02 | 0.00E+00 | 0.00E+00 |
| Surface # | 541 | 542 | 551 | 552 | 561 | 562 |
| K | 1.66E+00 | -6.81E-01 | -1.54E+02 | 3.87E+01 | 0.00E+00 | -7.75E+00 |
| $a_4$ | -3.24E-02 | 9.35E-02 | 9.70E-03 | 6.47E-03 | -9.80E-02 | -6.98E-02 |
| $a_6$ | 8.65E-03 | -8.39E-02 | -1.28E-02 | -4.68E-03 | 7.16E-02 | 4.21E-02 |
| $a_8$ | 3.04E-02 | 8.70E-02 | 1.36E-03 | -6.82E-04 | -3.91E-02 | -2.00E-02 |
| $a_{10}$ | -6.36E-03 | -2.76E-02 | -5.61E-04 | 1.32E-04 | 1.32E-02 | 6.12E-03 |
| $a_{12}$ | -4.21E-04 | 2.41E-03 | -9.90E-05 | 2.15E-05 | -2.54E-03 | -1.23E-03 |
| $a_{14}$ | 0.00E+00 | 0.00E+00 | 6.08E-05 | -1.32E-06 | 2.57E-04 | 1.54E-04 |
| $a_{16}$ | 0.00E+00 | 0.00E+00 | 0.00E+00 | 0.00E+00 | -1.09E-05 | -1.08E-05 |
| $a_{18}$ | | | | | | 3.17E-07 |

FIG. 21

| | f(Focus)= 4.058054mm, HFOV (Half angular field of view)=37.792deg., System length= 5.213mm, Fno= 2.05, Image hieght= 3.185mm |

| Surface # | | Radius | Thickness | Refractive index | Abbe number | Material | Focus |
|---|---|---|---|---|---|---|---|
| - | Object | ∞ | ∞ | | | | |
| 600 | Aperture stop | ∞ | -0.27 | | | | |
| 611 | 1st lens element | 1.802956 | 0.6385888 | 1.544102 | 56.1143 | plastic | 3.349 |
| 612 | | 112.1801 | 0.0621443 | | | | |
| 621 | 2nd lens element | 5.609025 | 0.3007804 | 1.6398 | 23.2654 | plastic | -6.959 |
| 622 | | 2.462847 | 0.4877558 | | | | |
| 631 | 3rd lens element | -18.13872 | 0.6476104 | 1.544102 | 56.1143 | plastic | 27.75 |
| 632 | | -8.276822 | 0.2168368 | | | | |
| 641 | 4th lens element | -2.262751 | 0.3794293 | 1.544102 | 56.1143 | plastic | 4.119 |
| 642 | | -1.183209 | 0.0551618 | | | | |
| 651 | 5th lens element | -9.386287 | 0.3887348 | 1.544102 | 56.1143 | plastic | -43.714 |
| 652 | | -14.18526 | 0.4526142 | | | | |
| 661 | 6th lens element | -44.11566 | 0.538233 | 1.544102 | 56.1143 | plastic | -3.583 |
| 662 | | 2.017493 | 0.45 | | | | |
| 671 | IR cut filter | ∞ | 0.3 | | | | |
| 672 | | ∞ | 0.2955012 | | | | |
| 680 | Image plane | ∞ | | | | | |

FIG. 24

| Aspherical parameters | | | | | | |
|---|---|---|---|---|---|---|
| Surface # | 611 | 612 | 621 | 622 | 631 | 632 |
| K | -6.30E+00 | 0.00E+00 | 0.00E+00 | -1.20E+01 | 0.00E+00 | 0.00E+00 |
| $a_4$ | 1.27E-01 | -6.61E-02 | -1.29E-01 | 2.34E-02 | -1.09E-01 | -9.28E-02 |
| $a_6$ | -4.59E-02 | 1.31E-01 | 2.84E-01 | 8.94E-02 | 7.02E-02 | -4.10E-03 |
| $a_8$ | -5.26E-04 | -1.41E-01 | -5.01E-01 | -1.18E-01 | -1.16E-01 | -2.18E-02 |
| $a_{10}$ | 9.09E-03 | 3.63E-02 | 7.30E-01 | 8.40E-02 | 1.04E-01 | 7.43E-03 |
| $a_{12}$ | 5.43E-03 | 0.00E+00 | -8.06E-01 | 2.03E-02 | -4.42E-02 | 0.00E+00 |
| $a_{14}$ | -1.22E-02 | 0.00E+00 | 4.99E-01 | -7.87E-02 | 0.00E+00 | 0.00E+00 |
| $a_{16}$ | | 0.00E+00 | -1.19E-01 | 4.23E-02 | 0.00E+00 | 0.00E+00 |
| Surface # | 641 | 642 | 651 | 652 | 661 | 662 |
| K | 1.72E+00 | -6.81E-01 | -1.41E+02 | 3.87E+01 | 0.00E+00 | -8.68E+00 |
| $a_4$ | -5.81E-02 | 7.81E-02 | 1.15E-02 | 4.30E-03 | -9.98E-02 | -6.99E-02 |
| $a_6$ | -3.23E-04 | -7.79E-02 | -1.67E-02 | -4.36E-03 | 7.20E-02 | 4.19E-02 |
| $a_8$ | 2.85E-02 | 8.88E-02 | 1.49E-03 | -8.33E-04 | -3.90E-02 | -2.00E-02 |
| $a_{10}$ | -4.85E-03 | -2.77E-02 | -2.99E-04 | 1.35E-04 | 1.32E-02 | 6.12E-03 |
| $a_{12}$ | 1.14E-03 | 2.23E-03 | -7.63E-05 | 2.52E-05 | -2.54E-03 | -1.23E-03 |
| $a_{14}$ | 0.00E+00 | 0.00E+00 | 5.34E-05 | -3.84E-07 | 2.57E-04 | 1.54E-04 |
| $a_{16}$ | 0.00E+00 | 0.00E+00 | 0.00E+00 | 0.00E+00 | -1.09E-05 | -1.08E-05 |
| $a_{18}$ | | | | | | 3.14E-07 |

FIG. 25

| f(Focus)= 4.175327mm, HFOV (Half angular field of view)=36.504deg., System length= 5.415mm, Fno= 2.00, Image hieght= 3.083mm ||||||||
|---|---|---|---|---|---|---|---|
| Surface # | | Radius | Thickness | Refractive index | Abbe number | Material | Focus |
| - | Object | ∞ | ∞ | | | | |
| 700 | Aperture stop | ∞ | -0.28 | | | | |
| 711 | 1st lens element | 1.931802 | 0.6793503 | 1.544102 | 56.1143 | plastic | 3.647 |
| 712 | | 56.67891 | 0.2672291 | | | | |
| 721 | 2nd lens element | -36.20361 | 0.2353925 | 1.6398 | 23.2654 | plastic | -4.776 |
| 722 | | 3.373537 | 0.2449197 | | | | |
| 731 | 3rd lens element | 3.301059 | 0.4022675 | 1.544102 | 56.1143 | plastic | 7.02 |
| 732 | | 22.78556 | 0.2779408 | | | | |
| 741 | 4th lens element | -1.470576 | 0.5020113 | 1.544102 | 56.1143 | plastic | 14.651 |
| 742 | | -1.391947 | 0.0863102 | | | | |
| 751 | 5th lens element | 10.32447 | 0.6350873 | 1.544102 | 56.1143 | plastic | 4.078 |
| 752 | | -2.77689 | 0.1158004 | | | | |
| 761 | 6th lens element | 57.82171 | 0.5453751 | 1.544102 | 56.1143 | plastic | -2.598 |
| 762 | | 1.379718 | 0.5 | | | | |
| 771 | IR cut filter | ∞ | 0.3 | | | | |
| 772 | | ∞ | 0.6238815 | | | | |
| 780 | Image plane | ∞ | | | | | |

FIG. 28

| Aspherical parameters | | | | | | |
|---|---|---|---|---|---|---|
| Surface # | 711 | 712 | 721 | 722 | 731 | 732 |
| K | 0.00E+00 | 0.00E+00 | 0.00E+00 | 0.00E+00 | 0.00E+00 | 0.00E+00 |
| $a_4$ | -7.70E-03 | -2.48E-03 | -3.11E-02 | -7.44E-02 | -1.13E-01 | -3.13E-02 |
| $a_6$ | 4.65E-02 | 4.19E-02 | 7.71E-02 | 1.23E-01 | 7.20E-03 | 1.61E-03 |
| $a_8$ | -7.76E-02 | -7.34E-02 | -1.45E-01 | -1.38E-01 | 0.00E+00 | 0.00E+00 |
| $a_{10}$ | 6.78E-02 | 3.57E-02 | 5.70E-02 | 5.05E-02 | 0.00E+00 | 0.00E+00 |
| $a_{12}$ | -2.56E-02 | -1.20E-02 | 0.00E+00 | 0.00E+00 | 0.00E+00 | 0.00E+00 |
| $a_{14}$ | 0.00E+00 | 0.00E+00 | 0.00E+00 | 0.00E+00 | 0.00E+00 | 0.00E+00 |
| $a_{16}$ | | | | | | |
| Surface # | 741 | 742 | 751 | 752 | 761 | 762 |
| K | 0.00E+00 | -3.32E+00 | 0.00E+00 | 0.00E+00 | 0.00E+00 | -6.54E+00 |
| $a_4$ | 1.91E-01 | 5.64E-02 | 7.49E-02 | 1.64E-01 | -4.09E-02 | -6.24E-02 |
| $a_6$ | 7.79E-02 | -1.85E-02 | -6.02E-02 | -5.76E-02 | 1.00E-02 | 2.16E-02 |
| $a_8$ | -6.20E-02 | 2.99E-02 | 1.72E-02 | 7.12E-03 | 1.01E-03 | -5.75E-03 |
| $a_{10}$ | 1.13E-02 | -1.63E-02 | -3.71E-03 | -2.46E-04 | -6.15E-04 | 9.58E-04 |
| $a_{12}$ | 1.19E-03 | 2.39E-03 | 0.00E+00 | 0.00E+00 | 7.68E-05 | -8.52E-05 |
| $a_{14}$ | 0.00E+00 | | 0.00E+00 | 0.00E+00 | -3.17E-06 | 3.05E-06 |
| $a_{16}$ | | | | | | |
| $a_{18}$ | | | | | | |

FIG. 29

| Embodiment | 1st Embodiment | 2nd Embodiment | 3rd Embodiment | 4th Embodiment | 5th Embodiment | 6th Embodiment | 7th Embodiment |
|---|---|---|---|---|---|---|---|
| $\dfrac{EFL}{CT3}$ | 12.92 | 13.41 | 8.94 | 10.29 | 8.03 | 6.27 | 10.38 |
| $\dfrac{TL}{CT6}$ | 10.12 | 10.11 | 10.87 | 10.13 | 8.00 | 7.74 | 7.32 |
| $\dfrac{EFL}{AC56+CT2}$ | 10.55 | 9.98 | 11.54 | 13.82 | 5.84 | 5.39 | 11.89 |
| $\dfrac{AC23+CT3+AC34}{CT3}$ | 2.94 | 3.00 | 2.56 | 2.57 | 2.37 | 2.09 | 2.30 |
| $\dfrac{AAG}{AC23+AC34}$ | 1.53 | 1.57 | 1.66 | 1.62 | 1.81 | 1.81 | 1.90 |
| $\dfrac{AC23+AC34}{AC12+AC45+AC56}$ | 1.90 | 1.75 | 1.50 | 1.62 | 1.24 | 1.24 | 1.11 |
| $\dfrac{EFL}{CT4+CT3}$ | 3.01 | 3.03 | 4.25 | 3.32 | 4.49 | 5.28 | 3.67 |
| $\dfrac{ALT}{CT6}$ | 7.71 | 7.64 | 7.52 | 7.57 | 5.55 | 5.38 | 5.50 |
| $\dfrac{EFL}{CT6+AC56}$ | 7.61 | 7.24 | 8.44 | 8.93 | 4.45 | 4.10 | 6.32 |
| $\dfrac{CT4}{CT5/CT2}$ | 5.66 | 5.83 | 4.29 | 5.29 | 3.07 | 2.55 | 4.83 |
| $\dfrac{TL}{CT2+AC56}$ | 10.17 | 9.53 | 10.86 | 13.51 | 5.90 | 5.53 | 11.37 |

FIG. 30

MOBILE DEVICE AND OPTICAL IMAGING LENS THEREOF

CROSS-REFERENCES TO RELATED APPLICATIONS

This application is a continuation of U.S. patent application Ser. No. 18/128,436, filed Mar. 30, 2023, which is a continuation of U.S. patent application Ser. No. 17/677,131, filed Feb. 22, 2022, now U.S. Pat. No. 11,644,652, which is a continuation of U.S. patent application Ser. No. 16/852,242, filed Apr. 17, 2020, now U.S. Pat. No. 11,294,150, which is a continuation of U.S. patent application Ser. No. 15/652,569, filed Jul. 18, 2017, now U.S. Pat. No. 10,678,023, which is a continuation of U.S. patent application Ser. No. 14/795,801, filed on Jul. 9, 2015, now U.S. Pat. No. 9,746,639, which is a continuation of U.S. patent application Ser. No. 13/963,717, filed on Aug. 9, 2013, now U.S. Pat. No. 9,097,876, which claims priority to Chinese Patent Application No. 201310159899.7, filed on May 3, 2013, the disclosures of which are hereby incorporated by reference in their entirety for all purposes.

TECHNICAL FIELD

The present invention relates to a mobile device and an optical imaging lens thereof, and particularly, relates to a mobile device applying an optical imaging lens having six lens elements and an optical imaging lens thereof.

BACKGROUND

The ever-increasing demand for smaller sized mobile devices, such as cell phones, digital cameras, etc. has correspondingly triggered a growing need for smaller sized photography modules contained therein. Size reductions may be contributed from various aspects of the mobile devices, which includes not only the charge coupled device (CCD) and the complementary metal-oxide semiconductor (CMOS), but also the optical imaging lens mounted therein. When reducing the size of the optical imaging lens, however, achieving good optical characteristics becomes a challenging problem.

The conventional optical imaging lenses generally have six lens elements. Since less number of the lens elements, the total length of the conventional optical imaging lenses could be limited to a certain length range. However, the ever-increasing demand for high standard productions, such as 12 million pixels smart phones or digital cameras, etc. has correspondingly triggered a growing need for high resolution and high quality. Therefore, there is needed to develop an optical imaging lens having six lens elements for high specification products.

SUMMARY

An object of the present invention is to provide a mobile device and an optical imaging lens thereof. With controlling the convex or concave shape of the surfaces of the lens elements, the length of the optical imaging lens is shortened and meanwhile the good optical characters, such as high resolution, are sustained.

In an exemplary embodiment, an optical imaging lens, sequentially from an object side to an image side, comprises first, second, third, fourth, fifth and sixth lens elements, each of the lens elements having an object-side surface facing toward the object side and an image-side surface facing toward the image side, in which the object-side surface of the first lens element comprises a convex portion in a vicinity of the optical axis; the image-side surface of the second lens element comprises a concave portion in a vicinity of a periphery of the second lens element; the image-side surface of the third lens element comprises a convex portion in a vicinity of a periphery of the third lens element; the image-side surface of the fourth lens element comprises a convex portion in a vicinity of the optical axis; the image-side surface of the fifth lens element comprises a convex portion in a vicinity of a periphery of the fifth lens element; and the image-side surface of the sixth lens element comprises a concave portion in a vicinity of the optical axis and a convex portion in a vicinity of a periphery of the sixth lens element; the optical imaging lens as a whole having only the six lens elements having refractive power. Accordingly, with controlling the convex or concave shape of the surfaces of these lens elements, the length of the optical imaging lens is shortened efficiently and meanwhile the aberration is eliminated for sustaining good optical characters.

In an exemplary embodiment, the object-side surface of the sixth lens element may be designed to have a concave portion in a vicinity of the optical axis and a convex portion in a vicinity of a periphery of the sixth lens element, the image-side surface of the third lens element may be designed to have a convex portion in a vicinity of the optical axis, and the image-side surface of the fourth lens element may be designed to have a convex portion in a vicinity of a periphery of the fourth lens element. Accordingly, with controlling the convex or concave shape of the surfaces of these lens elements, the length of the optical imaging lens is shortened efficiently and meanwhile the aberration is eliminated for sustaining good optical characters.

In another exemplary embodiment, some equation(s), such as those relating to the ratio among parameters could be taken into consideration. For example, an effective focal length of the optical imaging lens, EFL, and a central thickness of the third lens element along the optical axis, CT3, could be controlled to satisfy the equation as follows:

$$6.00 \le \frac{EFL}{CT3}. \qquad \text{Equation (1)}$$

In another exemplary embodiment, a distance from the object-side surface of the first lens element to the image-side surface of the sixth lens element, TL, and a central thickness of the sixth lens element along the optical axis, CT6, could be controlled to satisfy the equation as follows:

$$7.60 \le \frac{TL}{CT6}. \qquad \text{Equation (2)}$$

In another exemplary embodiment, an air gap between the fifth lens element and the sixth lens element, AC56, a central thickness of the second lens element along the optical axis, CT2, and EFL could be controlled to satisfy the equation as follows:

$$5.00 \le \frac{EFL}{CT2 + AC56}. \qquad \text{Equation (3)}$$

In another exemplary embodiment, an air gap between the second lens element and the third lens element, AC23, an air gap between the third lens element and the fourth lens element, AC34, and CT3 could be controlled to satisfy the equation as follows:

$$2.30 \leq \frac{AC23 + CT3 + AC34}{CT3}. \qquad \text{Equation (4)}$$

In another exemplary embodiment, a sum of all air gaps from the first lens element to the sixth lens element along the optical axis, AAG, AC23, and AC34 could be controlled to satisfy the equation as follows:

$$\frac{AAG}{AC23 + AC34} \leq 1.81. \qquad \text{Equation (5)}$$

In another exemplary embodiment, an air gap between the first lens element and the second lens element, AC12, an air gap between the fourth lens element and the fifth lens element, AC45, AC34 and AC56 could be controlled to satisfy the equation as follows:

$$1.20 \leq \frac{AC23 + AC34}{AC12 + AC45 + AC56}. \qquad \text{Equation (6)}$$

In another exemplary embodiment, a central thickness of the fourth lens element along the optical axis, CT4, a central thickness of the fifth lens element along the optical axis, CT5, and EFL could be controlled to satisfy the equation as follows:

$$\frac{EFL}{CT4 + CT5} \leq 5.40. \qquad \text{Equation (7)}$$

In another exemplary embodiment, the sum of the thickness of all six lens elements along the optical axis, ALT, and a central thickness of the sixth lens element along the optical axis, CT6, could be controlled to satisfy the equation as follows:

$$5.50 \leq \frac{ALT}{CT6}. \qquad \text{Equation (8)}$$

In another exemplary embodiment, an air gap between the fifth lens element and the sixth lens element, AC56, CT6 and EFL could be controlled to satisfy the equation as follows:

$$6.30 \leq \frac{EFL}{CT6 + AC56}. \qquad \text{Equation (9)}$$

In another exemplary embodiment, a central thickness of the third lens element, CT3, and EFL could be controlled to satisfy the equation as follows:

$$8.30 \leq \frac{EFL}{CT3}. \qquad \text{Equation (1')}$$

In another exemplary embodiment, a central thickness of the second lens element, CT2, a central thickness of the fourth lens element, CT4, and a central thickness of the fifth lens element, CT5, could be controlled to satisfy the equation as follows:

$$2.80 \leq \frac{CT4 + CT5}{CT2}. \qquad \text{Equation (10)}$$

In another exemplary embodiment, a central thickness of the second lens element, CT2, an air gap between the fifth lens element and the sixth lens element, AC56, and TL could be controlled to satisfy the equation as follows:

$$5.50 \leq \frac{TL}{CT2 + AC56}. \qquad \text{Equation (11)}$$

Aforesaid exemplary embodiments are not limited and could be selectively incorporated in other embodiments described herein.

In another exemplary embodiment, a mobile device comprises a housing and a photography module. The photography module is positioned in the housing and comprises a lens barrel, an optical imaging lens, a module housing unit, and an image sensor. The optical image lens is positioned in the lens barrel. The module housing unit is configured to provide a space where the lens barrel is positioned. The image sensor is positioned at the image side of the optical imaging lens.

In exemplary embodiments, the module housing unit comprises, but is not limited to, a lens backseat, which comprises a first lens seat and a second lens seat, in which the first lens seat is positioned close to the outside of the lens barrel and along with an axis, the second lens seat is positioned along the axis and around the outside of the first lens seat, and the lens barrel and the optical imaging lens positioned therein are driven by the first lens seat to move along the axis.

In exemplary embodiments, the module housing unit further comprises, but is not limited to, an image sensor backseat positioned between the first lens seat, the second lens seat and the image sensor, and close to the second lens seat.

Through controlling the arrangement of the convex or concave shape of the surface of the lens element(s) and/or refractive power, the mobile device and the optical imaging lens thereof in aforesaid exemplary embodiments achieve good optical characters and effectively shorten the lengths of the optical imaging lens.

BRIEF DESCRIPTION OF THE DRAWINGS

Exemplary embodiments will be more readily understood from the following detailed description when read in conjunction with the appended drawing, in which:

FIG. 4 is a table of optical data for each lens element of the optical imaging lens of the first embodiment of the present disclosures;

FIG. 5 is a table of aspherical data of the first embodiment of the optical imaging lens according to the present disclosures;

FIG. 8 is a table of optical data for each lens element of the optical imaging lens of the second embodiment of the present disclosures;

FIG. 9 is a table of aspherical data of the second embodiment of the optical imaging lens according to the present disclosures;

FIG. 12 is a table of optical data for each lens element of the optical imaging lens of the third embodiment of the present disclosures;

FIG. 13 is a table of aspherical data of the third embodiment of the optical imaging lens according to the present disclosures;

FIG. 16 is a table of optical data for each lens element of the optical imaging lens of the fourth embodiment of the present disclosures;

FIG. 17 is a table of aspherical data of the fourth embodiment of the optical imaging lens according to the present disclosures;

FIG. 20 is a table of optical data for each lens element of the optical imaging lens of the fifth embodiment of the present disclosures;

FIG. 21 is a table of aspherical data of a fifth embodiment of the optical imaging lens according to the present disclosures;

FIG. 24 is a table of optical data for each lens element of the optical imaging lens of the sixth embodiment of the present disclosures;

FIG. 25 is a table of aspherical data of the sixth embodiment of the optical imaging lens according to the present disclosures;

FIG. 28 is a table of optical data for each lens element of the optical imaging lens of the seventh embodiment of the present disclosures;

FIG. 29 is a table of aspherical data of the seventh embodiment of the optical imaging lens according to the present disclosures;

FIG. 30 is a table for the values of EFL/CT3, TL/CT6, $$\frac{EFL}{CT2+AC56}, \frac{AC23+CT3+AC34}{CT3},$$

$$\frac{AAG}{AC23+AC34}, \frac{AC23+AC34}{AC12+AC45+AC56}, \frac{EFL}{CT4+CT5},$$

Figure 31:
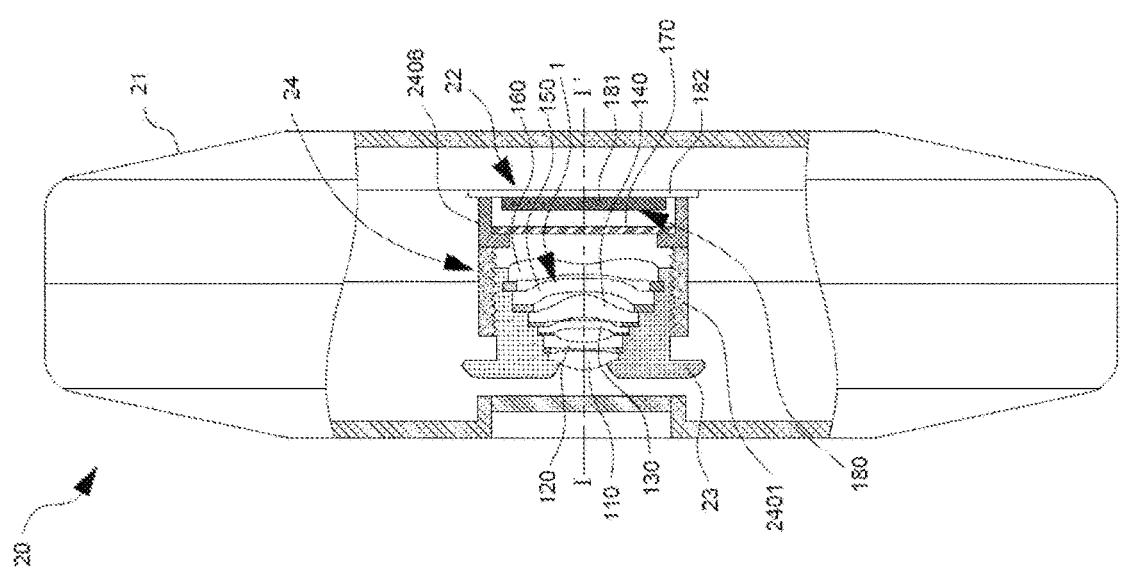

ALT/CT6, $$\frac{EFL}{CT6+AC56}, \frac{CT4+CT5}{CT2}, \text{ and } \frac{TL}{CT2+AC56}$$

of all seven example embodiments;

FIG. 31 is a structure of an example embodiment of a mobile device; and

Figure 32:
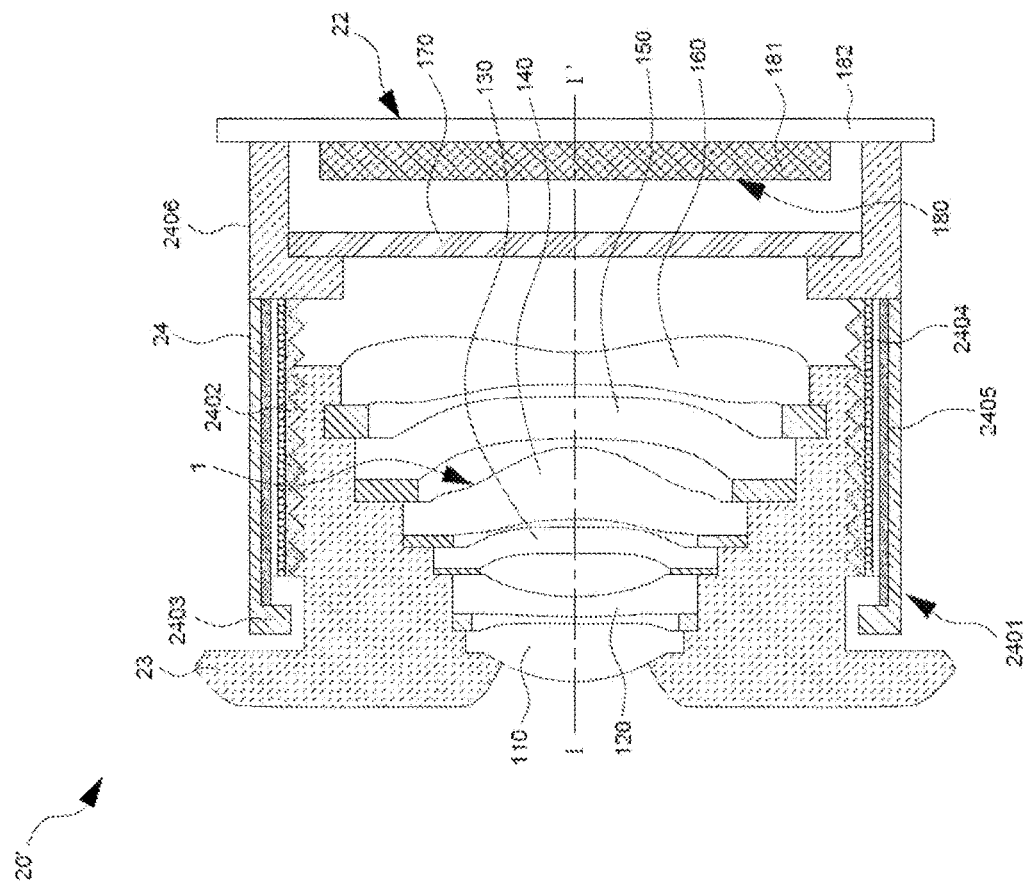

FIG. 32 is a partially enlarged view of the structure of another example embodiment of a mobile device.

DETAILED DESCRIPTION OF SPECIFIC EMBODIMENTS

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Figure 1:
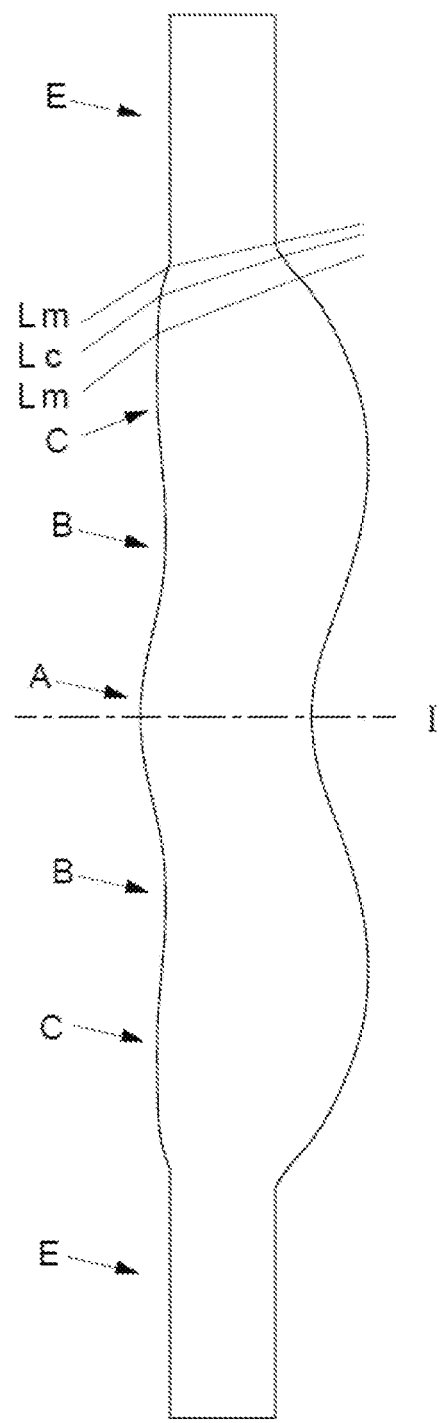
FIG. 1 is a cross-sectional view of a lens element of one embodiment of an optical imaging lens according to the present disclosures.

As used in the disclosures, the description "a lens element has a positive refractive power (or a negative refractive power)" means a portion of the lens in a vicinity of the optical axis has a positive refractive power (or a negative refractive power). Furthermore, as used herein, the description "an object-side (or the image-side) of a lens element comprises a convex portion (or a concave portion) in a certain region" means the portion in the certain region parallel to the optical axis is more convex outward (or more concave inward) than that in the outside region close to the certain region in the radial direction. As shown in FIG. 1, the axis I represents the optical axis and the lens element is symmetric about the axis I in the radial direction. The object-side surface of the lens element comprises a convex portion in the A region, a concave portion in the B region, and a convex portion in the C region. The portion in the A region parallel to the optical axis is more convex outward than the portion in the outside region (B region) close to the A region in the radial direction. The portion in the B region is more concave inward than the portion in the C region. The portion in the C region is more convex outward than the E region. Furthermore, as used herein, the description "in a vicinity of a periphery of a lens element" means in the vicinity of the periphery region on the surface of the lens element only where the imaging light passes, such as the C region. The imaging light comprises a chief ray Lc and a marginal ray Lm. Furthermore, as used herein, the description "in a vicinity of the optical axis" means in the vicinity of the optical axis on the surface of the lens element only where the imaging light passes, such as the A region. Besides, the lens element further comprises a protruding part E for mounting the lens element in an optical imaging lens, and ideally, the imaging light will not pass through the protruding part E. The structure and the shape of the protruding part E is not limited to this configuration illustrated in the FIG. 1. To clearly illustrate the structure of each lens element, each portion of the protruding part E in the embodiments is omitted.

Example embodiments of an optical imaging lens may comprise a first lens element, a second lens element, a third lens element, a fourth lens element, a fifth lens element, and a sixth lens element, in which each of the lens elements has an object-side surface facing toward the object side and an image-side surface facing toward the image side. These lens elements may be arranged sequentially from the object side to the image side, and example embodiments of the lens as a whole may comprise the six lens elements having refractive power. In an example embodiment: the object-side surface of the first lens element comprises a convex portion in a vicinity of the optical axis; the image-side surface of the second lens element comprises a concave portion in a vicinity of a periphery of the second lens element; the image-side surface of the third lens element comprises a convex portion in a vicinity of a periphery of the third lens element; the image-side surface of the fourth lens element comprises a convex portion in a vicinity of the optical axis; the image-side surface of the fifth lens element comprises a convex portion in a vicinity of a periphery of the fifth lens element; and the image-side surface of the sixth lens element comprises a concave portion in a vicinity of the optical axis and a convex portion in a vicinity of a periphery of the sixth lens element.

The designed characteristics of the lens elements in aforesaid exemplary embodiments are taken the optical characters and the lengths of the optical imaging lens into consideration. For example, the first lens element has a positive refractive power, the object-side surface of the first lens element comprises a convex portion in a vicinity of the optical axis, and the image-side surface of the first lens element comprises a convex portion in a vicinity of a periphery of the first lens element for assisting the optical imaging lens to converge the light. In conjunction with the above-mention design on the surfaces of the lens elements, the image-side surface of the second lens element comprises a concave portion in a vicinity of a periphery of the second lens element, the image-side surface of the third lens element comprises a convex portion in a vicinity of a periphery of the third lens element, the image-side surface of the fourth lens element comprises a convex portion in a vicinity of the optical axis, the image-side surface of the fifth lens element comprises a convex portion in a vicinity of a periphery of the fifth lens element, and the image-side surface of the sixth lens element comprises a concave portion in a vicinity of the optical axis for eliminating the aberration. Further, the object-side surface of the second lens element comprises a convex portion in a vicinity of the optical axis, a convex portion in a vicinity of a periphery of the second lens element, and a concave portion between a vicinity of the optical axis and a vicinity of a periphery of the second lens element for improving the efficiency of aberration elimination. Besides, the image-side surface of the sixth lens element comprises a concave portion in a vicinity of the optical axis and a convex portion in a vicinity of a periphery of the sixth lens element for assisting the optical imaging lens to correct the field curvature of the optical imaging lens, reduce the high order aberration of the optical imaging lens, and depress the angle of the chief ray (the incident angle of the light onto the image sensor), and then the sensitivity of the whole system is promoted. Additionally, the object-side surface of the sixth lens element comprises a convex portion in a vicinity of a periphery of the sixth lens element for assisting the optical imaging lens to eliminate edge aberration. Therefore, the present embodiment achieves great optical performance.

In another exemplary embodiment, the ratio of related parameters of the optical imaging lens could be controlled to satisfy equations for assisting the designer to design the optical imaging lens with good optical characteristics and short total length under practicable technic, such as an effective focal length of the optical imaging lens, EFL, and a central thickness of the third lens element along the optical axis, CT3, could be controlled to satisfy the equation as follows:

$$6.00 \le \frac{EFL}{CT3} \qquad \text{Equation (1)}.$$

In another exemplary embodiment, a distance from the object-side surface of the first lens element to the image-side surface of the sixth lens element, TL, and a central thickness of the sixth lens element along the optical axis, CT6, could be controlled to satisfy the equation as follows:

$$7.60 \le \frac{TL}{CT6} \qquad \text{Equation (2)}.$$

In another exemplary embodiment, an air gap between the fifth lens element and the sixth lens element, AC56, a central thickness of the second lens element along the optical axis, CT2, and EFL could be controlled to satisfy the equation as follows:

$$5.00 \le \frac{EFL}{CT2 + AC56} \quad \text{Equation (3)}.$$

In another exemplary embodiment, an air gap between the second lens element and the third lens element, AC23, an air gap between the third lens element and the fourth lens element, AC34, and CT3 could be controlled to satisfy the equation as follows:

$$2.30 \le \frac{AC23 + CT3 + AC34}{CT3} \quad \text{Equation (4)}.$$

In another exemplary embodiment, a sum of all air gaps from the first lens element to the sixth lens element along the optical axis, AAG, AC23, and AC34 could be controlled to satisfy the equation as follows:

$$\frac{AAG}{AC23 + AC34} \le 1.81 \quad \text{Equation (5)}.$$

In another exemplary embodiment, an air gap between the first lens element and the second lens element, AC12, an air gap between the fourth lens element and the fifth lens element, AC45, AC34 and AC56 could be controlled to satisfy the equation as follows:

$$1.20 \le \frac{AC23 + AC34}{AC12 + AC45 + AC56} \quad \text{Equation (6)}.$$

In another exemplary embodiment, a central thickness of the fourth lens element along the optical axis, CT4, a central thickness of the fifth lens element along the optical axis, CT5, and EFL could be controlled to satisfy the equation as follows:

$$\frac{EFL}{CT4 + CT5} \le 5.40 \quad \text{Equation (7)}.$$

In another exemplary embodiment, the sum of the thickness of all six lens elements along the optical axis, ALT, and a central thickness of the sixth lens element along the optical axis, CT6, could be controlled to satisfy the equation as follows:

$$5.50 \le \frac{ALT}{CT6} \quad \text{Equation (8)}.$$

In another exemplary embodiment, an air gap between the fifth lens element and the sixth lens element, AC56, CT6 and EFL could be controlled to satisfy the equation as follows:

$$6.30 \le \frac{EFL}{CT6 + AC56} \quad \text{Equation (9)}.$$

In another exemplary embodiment, a central thickness of the third lens element, CT3, and EFL could be controlled to satisfy the equation as follows:

$$8.30 \le \frac{EFL}{CT3} \quad \text{Equation (1')}.$$

In another exemplary embodiment, a central thickness of the second lens element, CT2, a central thickness of the fourth lens element, CT4, and a central thickness of the fifth lens element, CT5, could be controlled to satisfy the equation as follows:

$$2.80 \le \frac{CT4 + CT5}{CT2} \quad \text{Equation (10)}.$$

In another exemplary embodiment, a central thickness of the second lens element, CT2, an air gap between the fifth lens element and the sixth lens element, AC56, and TL could be controlled to satisfy the equation as follows:

$$5.50 \le \frac{TL}{CT2 + AC56} \quad \text{Equation (11)}.$$

Aforesaid exemplary embodiments are not limited and could be selectively incorporated in other embodiments described herein.

Reference is now made to Equation (1). The design for the value of EFL/CT3 is based on the effective focal length of the optical imaging lens, EFL. The effective focal length of the optical imaging lens, EFL, would be shrunken to meet the demand of small sized optical imaging lens. When EFL/CT3 meets to Equation (1), the effective focal length of the optical imaging lens, EFL, and the central thickness of the third lens element along the optical axis, CT3, could be in proper range to prevent excessive central thickness of the third lens element along the optical axis, CT3, which is unfavorable for shortening the length of the optical imaging lens. If the value of EFL/CT3 further satisfy the Equation (1'), the shorten range of the third lens element along the optical axis, CT3, is greater. More preferably, the value of EFL/CT3 should be further restricted by an upper limit, for example but not limited to, $$6.00 \le \frac{EFL}{CT3} \le 15.00.$$

Reference is now made to Equation (2). The design for the value of TL/CT6 is based on the central thickness of the sixth lens element along the optical axis, CT6. The central thickness of the sixth lens element along the optical axis, CT6, would be shrunken to meet the demand of small sized optical imaging lens. When TL/CT6 meets to Equation (2), the central thickness of the sixth lens element along the optical axis, CT6, and the distance from the object-side surface of the first lens element to the image-side surface of the sixth lens element, TL, could be in proper range to prevent excessive central thickness of the sixth lens element along the optical axis, CT6, which is unfavorable for shortening the length of the optical imaging lens. More preferably, the value of TL/CT6 should be further restricted by an upper limit, for example but not limited to, $$7.66 \le \frac{TL}{CT6} \le 13.00.$$

Reference is now made to Equation (3). The design for the value of $$\frac{EFL}{CT2 + AC56}$$

is based on the effective focal length of the optical imaging lens, EFL. The effective focal length of the optical imaging lens, EFL, would be shrunken to meet the demand of small sized optical imaging lens. When $$\frac{EFL}{CT2 + AC56}$$

meets to Equation (3), the central thickness of the second lens element along the optical axis, CT2, and the air gap between the fifth lens element and the sixth lens element, AC56, could be in proper range to prevent excessive central thickness of the second lens element along the optical axis, CT2, and excessive air gap between the fifth lens element and the sixth lens element, AC56, that is unfavorable for shortening the length of the optical imaging lens. More preferably, the value of $$\frac{EFL}{CT2 + AC56}$$

should be further restricted by an upper limit, for example but not limited to, $$5.00 \le \frac{EFL}{CT2 + AC56} \le 15.00.$$

Reference is now made to Equation (4). The design for the value of $$\frac{AC23 + CT3 + AC34}{CT3}$$

is based on the path of light, the fabricating yield of each lens element, and the difficulties of assembling the optical imaging lens. When $$\frac{AC23 + CT3 + AC34}{CT3}$$

meets to Equation (4), the air gap between the second lens element and the third lens element, AC23, the air gap between the third lens element and the fourth lens element, AC34, and the central thickness of the third lens element along the optical axis, CT3, could be in proper arrangement, that is favorable for shortening the length of the optical imaging lens. More preferably, the value of $$\frac{AC23 + CT3 + AC34}{CT3}$$

should be further restricted by an upper limit, for example but not limited to, $$2.30 \le \frac{AC23 + CT3 + AC34}{CT3} \le 3.50.$$

Reference is now made to Equation (5). The design for the value of $$\frac{AAG}{AC23 + AC34}$$

is based on the air gap between the second lens element and the third lens element, AC23. Since the image-side surface of the second lens element comprises a concave portion in a vicinity of a periphery of the second lens element, the emitted light from the second lens element (imaging light) needs enough air gap to incident to a proper position on the third lens element. Hence, comparing to other air gaps, the shortened range of the air gap between the second lens element and the third lens element along the optical axis, A23, is under a considerable restriction. However, too small air gap between the second lens element and the third lens element along the optical axis, A23, would increase fabrication difficulties of each lens element. When $$\frac{AAG}{AC23 + AC34}$$

meets to Equation (5) based on the path of light, and the fabricating difficulties of each lens element, the air gaps, AC23, AC34, and AAG could be in proper arrangement. More preferably, the value of $$\frac{AAG}{AC23 + AC34}$$

should be further restricted by an lower limit, for example but not limited to, $$1.00 \le \frac{AAG}{AC23 + AC34} \le 1.81.$$

Reference is now made to Equation (6). The design for the value of $$\frac{AC23 + AC34}{AC12 + AC45 + AC56}$$

is based on each air gap, the path of light, and the difficulties of assembling the optical imaging lens. When $$\frac{AC23 + AC34}{AC12 + AC45 + AC56}$$

meets to Equation (6), each air gap could be in proper arrangement, which is favorable for shortening the length of the optical imaging lens. More preferably, the value of $$\frac{AC23 + AC34}{AC12 + AC45 + AC56}$$

should be further restricted by an upper limit, for example but not limited to, $$1.20 \le \frac{AC23 + AC34}{AC12 + AC45 + AC56} \le 2.50.$$

Reference is now made to Equation (7). The design for the value of $$\frac{EFL}{CT4 + CT5}$$

is based on the effective focal length of the optical imaging lens, EFL. The effective focal length of the optical imaging lens, EFL, would be shrunken to meet the demand of small sized optical imaging lens. When $$\frac{EFL}{CT4 + CT5}$$

meets to Equation (7), the central thickness of the fourth lens element along the optical axis, CT4, and the central thickness of the fifth lens element, CT5, would be in a proper range, which is favorable for shortening the length of the optical imaging lens. More preferably, the value of $$\frac{EFL}{CT4 + CT5}$$

should be further restricted by an lower limit, for example but not limited to, $$2.50 \le \frac{EFL}{CT4 + CT5} \le 5.40.$$

Reference is now made to Equation (8). The design for the value of ALT/CT6 is based on the thickness of all six lens elements along the optical axis, ALT. The thickness of all six lens elements along the optical axis, ALT, would be shrunken to meet the demand of small sized optical imaging lens. When ALT/CT6 meets to Equation (8), the central thickness of the sixth lens element along the optical axis, CT6, could be in proper range to prevent excessive central thickness of the sixth lens element along the optical axis, CT6. More preferably, the value of ALT/CT6 should be further restricted by an upper limit, for example but not limited to, $$5.50 \le \frac{ALT}{CT6} \le 8.50.$$

Reference is now made to Equation (9). The design for the value of $$\frac{EFL}{CT6 + AC56}$$

is based on the effective focal length of the optical imaging lens, EFL. The effective focal length of the optical imaging lens, EFL, would be shrunken to meet the demand of small sized optical imaging lens. When $$\frac{EFL}{CT6 + AC56}$$

meets to Equation (9), the central thickness of the sixth lens element along the optical axis, CT6, and the air gap between the fifth lens element and the sixth lens element, AC56, could be in proper range to prevent excessive central thickness of the sixth lens element along the optical axis, CT6, and excessive air gap between the fifth lens element and the sixth lens element, AC56. More preferably, the value of $$\frac{EFL}{CT6 + AC56}$$

should be further restricted by an upper limit, for example but not limited to, $$6.30 \le \frac{EFL}{CT6 + AC56} \le 9.50.$$

Reference is now made to Equation (10). The design for the value of $$\frac{CT4 + CT5}{CT2}$$

is based on the central thickness of the fourth lens element along the optical axis, CT4, and the central thickness of the fifth lens element along the optical axis, CT5. Since the fourth lens element and fifth lens element have larger effective optical diameters, the central thickness of the fourth lens element along the optical axis, CT4, and the central thickness of the fifth lens element along the optical axis, CT5, are thicker than the central thickness of the second lens element along the optical axis, CT2. When $$\frac{CT4 + CT5}{CT2}$$

meets to Equation (10), the central thickness of the second lens element along the optical axis, CT2, could be in proper arrangement, which is favorable for shortening the length of the optical imaging lens. More preferably, the value of $$\frac{CT4 + CT5}{CT2}$$

should be further restricted by an upper limit, for example but not limited to, $$2.80 \le \frac{CT4 + CT5}{CT2} \le 6.50.$$

Reference is now made to Equation (11). The design for the value of $$\frac{TL}{CT2 + AC56}$$

is based on the distance between the object-side surface of the first lens element to the image-side surface of the sixth lens element, TL. The object-side surface of the first lens element to the image-side surface of the sixth lens element, TL, would be shrunken to meet the demand of small sized optical imaging lens. When $$\frac{TL}{CT2 + AC56}$$

meets to Equation (11), the central thickness of the second lens element along the optical axis, CT2, and the air gap between the fifth lens element and the sixth lens element, AC56, could be in proper arrangement to prevent excessive second lens element along the optical axis, CT2, and excessive air gap between the fifth lens element and the sixth lens element, AC56, that is favorable for shortening the length of the optical imaging lens. More preferably, the value of $$\frac{TL}{CT2 + AC56}$$

should be further restricted by an upper limit, for example but not limited to, $$5.50 \le \frac{TL}{CT2 + AC56} \le 15.00.$$

When implementing example embodiments, more details about the convex or concave surface structure and/or the refractive power may be incorporated for one specific lens element or broadly for plural lens elements to enhance the control for the system performance and/or resolution, as illustrated in the following embodiments. It is noted that the details listed here could be incorporated in example embodiments if no inconsistency occurs.

Figure 2:
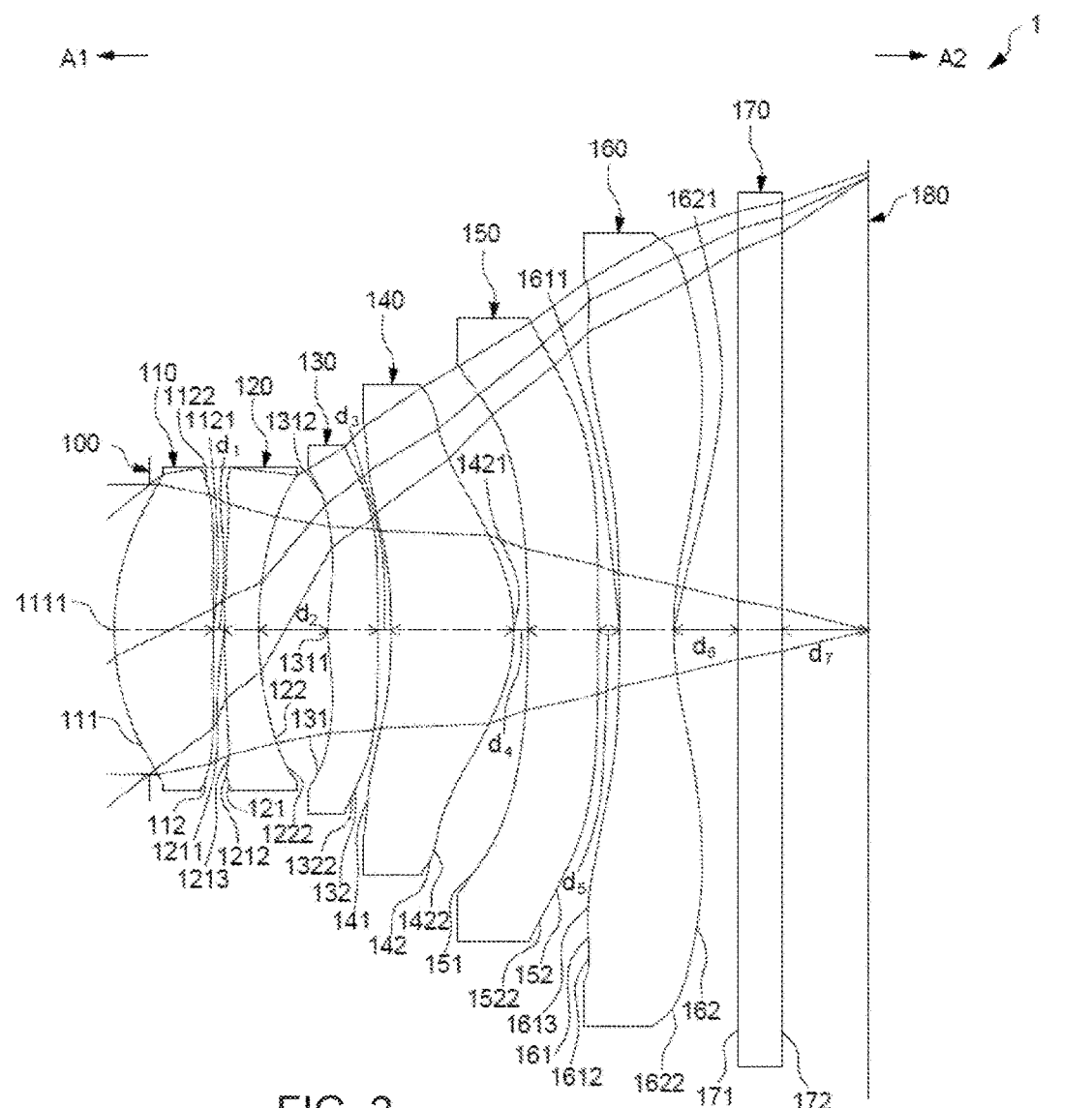
FIG. 2 is a cross-sectional view of a first embodiment of the optical imaging lens having six lens elements according to the present disclosures.
Figure 3:
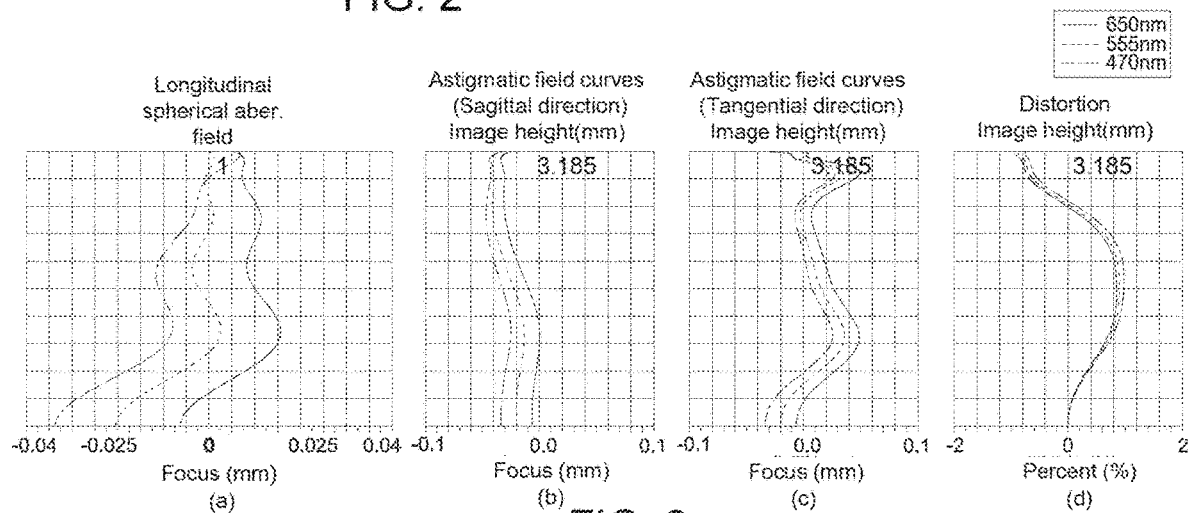
FIG. 3 is a chart of longitudinal spherical aberration and other kinds of optical aberrations of the first embodiment of the optical imaging lens according to the present disclosures.

Several exemplary embodiments and associated optical data will now be provided for illustrating example embodiments of optical imaging lens with good optical characters and a shortened length. Reference is now made to FIGS. 2-5. FIG. 2 illustrates a cross-sectional view of a first embodiment of the optical imaging lens 1 having six lens elements according to the present disclosures. FIGS. 3(a) to 3(d) show example charts of longitudinal spherical aberration and other kinds of optical aberrations of the optical imaging lens 1 according to an example embodiment. FIG. 4 illustrates an example table of optical data of each lens element of the optical imaging lens 1 according to an example embodiment. FIG. 5 depicts an example table of aspherical data of the optical imaging lens 1 according to an example embodiment.

As shown in FIG. 2, the optical imaging lens 1 of the present embodiment comprises, in order from an object side A1 to an image side A2, an aperture stop 100, a first lens element 110, a second lens element 120, a third lens element 130, a fourth lens element 140, a fifth lens element 150, and the sixth lens element 160. The aperture stop 100 may be also disposed between the first lens element 110 and the second element 120 or other position. A filtering unit 170 and an image plane 180 of an image sensor are positioned at the image side A2 of the optical image lens 1. More specifically, the filtering unit 170 is an IR cut filter (infrared cut filter) positioned between the sixth lens 160 and the image plane 180 of the image sensor. The filtering unit 170 selectively absorbs light with specific wavelength from the light passing optical imaging lens 1. For example, IR light is absorbed, and this will prohibit the IR light which is not seen by human eyes from producing an image on the image plane 180.

Exemplary embodiments of each lens elements of the optical imaging lens 1 will now be described with reference to the drawings. Each of the first, second, third, fourth, fifth, and sixth lens elements 110, 120, 130, 140, 150, 160 has an object-side surface 111/121/131/141/151/161 facing toward the object side A1 and an image-side surface 112/122/132/142/152/162 facing toward the image side A2. Both object-side surface 111/121/131/141/151/161 and image-side surface 112/122/132/142/152/162 may be aspherical surfaces.

The first lens element 110 has a positive refractive power, which may be constructed by plastic material. The object-side surface 111 is a convex surface, which comprises a convex portion 111 in a vicinity of the optical axis. The image-side surface 112 comprises a concave portion 1121 in a vicinity of the optical axis, and a convex portion 1122 in a vicinity of a periphery of the first lens element 110.

The second lens element 120 may have a negative refractive power, which may be constructed by plastic material. The object-side surface 121 comprises a convex portion 1211 in a vicinity of the optical axis, a convex portion 1212 in a vicinity of a periphery of the second lens element 120, and a concave portion 1213 between a vicinity of the optical axis and a vicinity of a periphery of the second lens element 120. The image-side surface 122 is a concave surface and comprises a concave portion 1222 in a vicinity of a periphery of the second lens element 120.

The third lens element 130 may have a positive refractive power, which may be constructed by plastic material. The object-side surface 131 comprises a convex portion 1311 in a vicinity of the optical axis, and a concave portion 1312 in a vicinity of a periphery of the third lens element 130. The image-side surface 132 is a convex surface, which comprises a convex portion 1322 in a vicinity of a periphery of the third lens element 130.

The fourth lens element 140 may have a positive refractive power, which may be constructed by plastic material. The object-side surface 141 is a concave surface. The image-side surface 142 is a convex surface, which comprises a concave portion 1421 in a vicinity of the optical axis, and a convex portion 1422 in a vicinity of a periphery of the fourth lens element 140.

The fifth lens element 150 may have a negative refractive power, which may be constructed by plastic material. The object-side surface 151 is a concave surface. The image-side surface 152 is a convex surface, which comprises a convex portion 1522 in a vicinity of a periphery of the fifth lens element 150.

The sixth lens element 160 may have a negative refractive power, which may be constructed by plastic material. The object-side surface 161 comprises a concave portion 1611 in a vicinity of the optical axis, a concave portion 1612 in a vicinity of a periphery of the sixth lens element 160, and a convex portion 1613 between a vicinity of the optical axis and a vicinity of a periphery of the sixth lens element 160. The image-side surface 162 comprises a concave portion 1621 in a vicinity of the optical axis and a convex portion 1622 in a vicinity of a periphery of the sixth lens element 160.

In example embodiments, air gaps exist between the lens elements 110-160, the filtering unit 160, and the image plane 180 of the image sensor. For example, FIG. 2 illustrates the air gap $d_1$ existing between the first lens element 110 and the second lens element 120, the air gap $d_2$ existing between the second lens element 120 and the third lens element 130, the air gap $d_3$ existing between the third lens element 130 and the fourth lens element 140 the air gap $d_4$ existing between the fourth lens element 140 and the fifth lens element 150, the air gap $d_5$ existing between the fifth lens element 150 and the sixth lens element 160, the air gap do existing between the sixth lens element 160 and the filtering unit 170, and the air gap $d_7$ existing between the filtering unit 170 and the image plane 180 of the image sensor. However, in other embodiments, any of the aforesaid air gaps may or may not exist. For example, the profiles of opposite surfaces of any two adjacent lens elements may correspond to each other, and in such situation, the air gaps may not exist. The air gap $d_1$ is denoted by AC12, the air gap $d_2$ is denoted by AC23, the air gaps $d_3$ is denoted by AC34, the air $d_4$ gap is denoted by AC45, the air gap $d_5$ is denoted by AC56, and the sum of all air gaps $d_1$, $d_2$, $d_3$, $d_4$, $d_5$ between the first though sixth lens elements is denoted by AAG.

FIG. 4 depicts the optical characteristics of each lens elements in the optical imaging lens 1 and thicknesses of the air gaps of the present embodiment. The distance from the object-side surface 111 of the first lens element 110 to the image plane 180 along the optical axis is 5.27 mm, and the length of the optical imaging lens 1 is indeed shortened. Besides the image height of the optical imaging lens 1 is 3.185 mm.

The aspherical surfaces, including the object-side surfaces 111, 121, 131, 141, 151, 161 and the image-side surfaces 112, 122, 132, 142, 152, 162 are all defined by the following aspherical formula:

$$Z(Y) = \frac{Y^2}{R} / \left(1 + \sqrt{1 - (1+K)\frac{Y^2}{R^2}}\right) + \sum_{i=1}^{a} a_{2i} \times Y^{2i}$$

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant; and $a_{2i}$ represents a aspherical coefficient of $2i^{th}$ order.

The values of each aspherical parameter, K, and $a_4$-$a_{16}$ of each lens element 110, 120, 130, 140 are represented in FIG. 5.

FIG. 3(a) illustrates the longitudinal spherical aberration of the present embodiment, in which curves of different wavelengths are distributed closely, that means the off-axis light with different height of different wavelengths converge in a vicinity of the imaging point. FIG. 3(a) shows that the offsets between the off-axis light with different light and the imaging point are controlled to be ±0.035 mm. Therefore, the present embodiment improves the spherical aberration in different wavelengths obviously. Additionally, the distances between the three represented wavelengths are quite close, that means the image positions of the different wavelengths converge with one another, such that the chromatic aberration is improved obviously.

FIG. 3(b) illustrates an astigmatism aberration in the sagittal direction of the present embodiment, and FIG. 3(c) illustrates an astigmatism aberration in the tangential direction of the present embodiment. The focal lengths of the three represented wavelengths in the whole field of view are within ±0.05 mm, and the focal lengths of the sagittal direction are further controlled within ±0.05 mm. Therefore, the optical imaging lens 1 of the present embodiment could eliminate the aberration effectively. Additionally, the distances between the three represented wavelengths are quite close, that means the aberration is improved obviously.

FIG. 3(d) illustrates a distortion aberration of the present embodiment. The distortion aberration of the present embodiment is maintained within the range of ±1%, that means the distortion aberration meets the image quality of optical system. Accordingly, the system length of the optical imaging lens 1 is shortened to be 5.27 mm approximately, which could overcome the chromatic aberration and provide better image quality. Therefore, the present embodiment achieves great optical performance and the length of the optical imaging lens 1 is effectively shortened.

Figure 6:
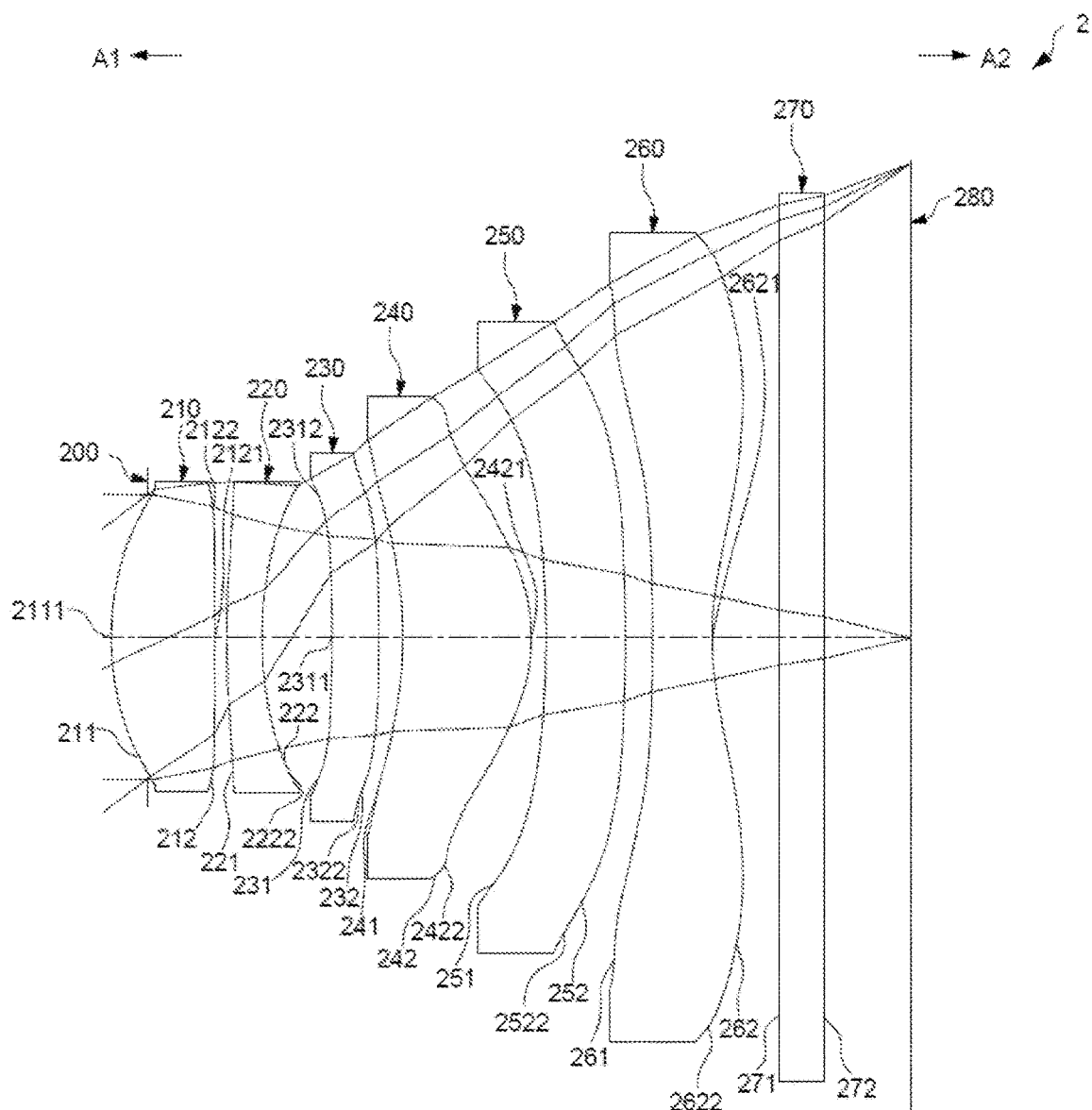
FIG. 6 is a cross-sectional view of a second embodiment of an optical imaging lens having six lens elements according to the present disclosures.
Figure 7:
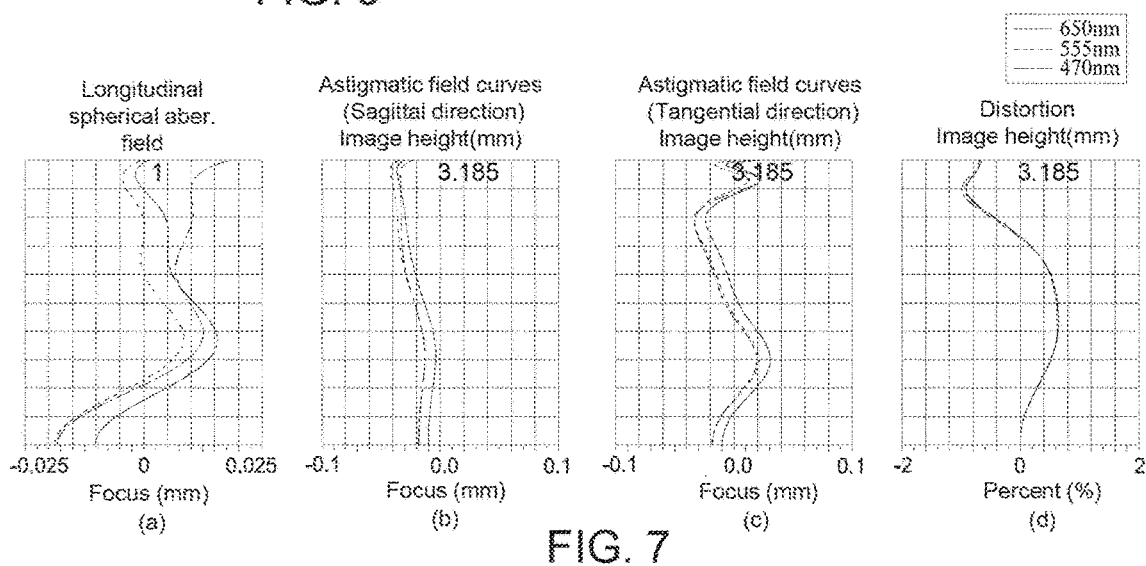
FIG. 7 is a chart of longitudinal spherical aberration and other kinds of optical aberrations of the second embodiment of the optical imaging lens according to the present disclosures.

Reference is now made to FIGS. 6-9. FIG. 6 illustrates an example cross-sectional view of an optical imaging lens 2 having six lens elements of the optical imaging lens according to a second example embodiment. FIG. 7 shows example charts of longitudinal spherical aberration and other kinds of optical aberrations of the optical imaging lens 2 according to the second example embodiment. FIG. 8 shows an example table of optical data of each lens element of the optical imaging lens 2 according to the second example embodiment. FIG. 9 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 6, the second embodiment is similar to the first embodiment. The optical imaging lens 2, in an order from an object side A1 to an image side A2, comprises an aperture stop 200, first lens element to sixth lens element 210-260. A filtering unit 270 and an image plane 280 of an image sensor are positioned at the image side A2 of the optical imaging lens 2. The arrangement of the convex or concave surface structures, including the object-side surfaces 211, 231, 241, 251, 261 and image-side surfaces 212, 222, 232, 242, 252, 262, and the refractive power of the lens elements 210-260 are generally same with the optical imaging lens 1. The difference between the optical imaging lens 1 and the optical imaging lens 2 is the radius of curvature, the values of the central thicknesses of the lens elements 210-260 and the air gaps between the lens elements 210-260 are slight different from the values of the optical imaging lens 1. Besides, the second lens element 210 and the sixth lens element 260 are slight different from these in the first embodiment. More specifically, the object-side surface 221 of the second lens element 220 is a convex surface, and the object-side 261 of the sixth lens element 260 is a concave surface.

Please refer to FIG. 8 for the optical characteristics of each lens elements in the optical imaging lens 2 and thicknesses of the air gaps of the present embodiment. The distance from the object-side surface 211 of the first lens element 210 to the image plane 280 along the optical axis is 5.36 mm, and the length of the optical imaging lens 2 is indeed shortened.

As shown in FIGS. 7(a)-7(d), the optical imaging lens 2 of the present embodiment shows great characteristics in longitudinal spherical aberration 7(a), astigmatism in the sagittal direction 7(b), astigmatism in the tangential direction 7(c), and distortion aberration 7(d). Therefore, according to the above illustration, the optical imaging lens of the present embodiment indeed shows great optical performance and the length of the optical imaging lens 2 is effectively shortened.

Figure 10:
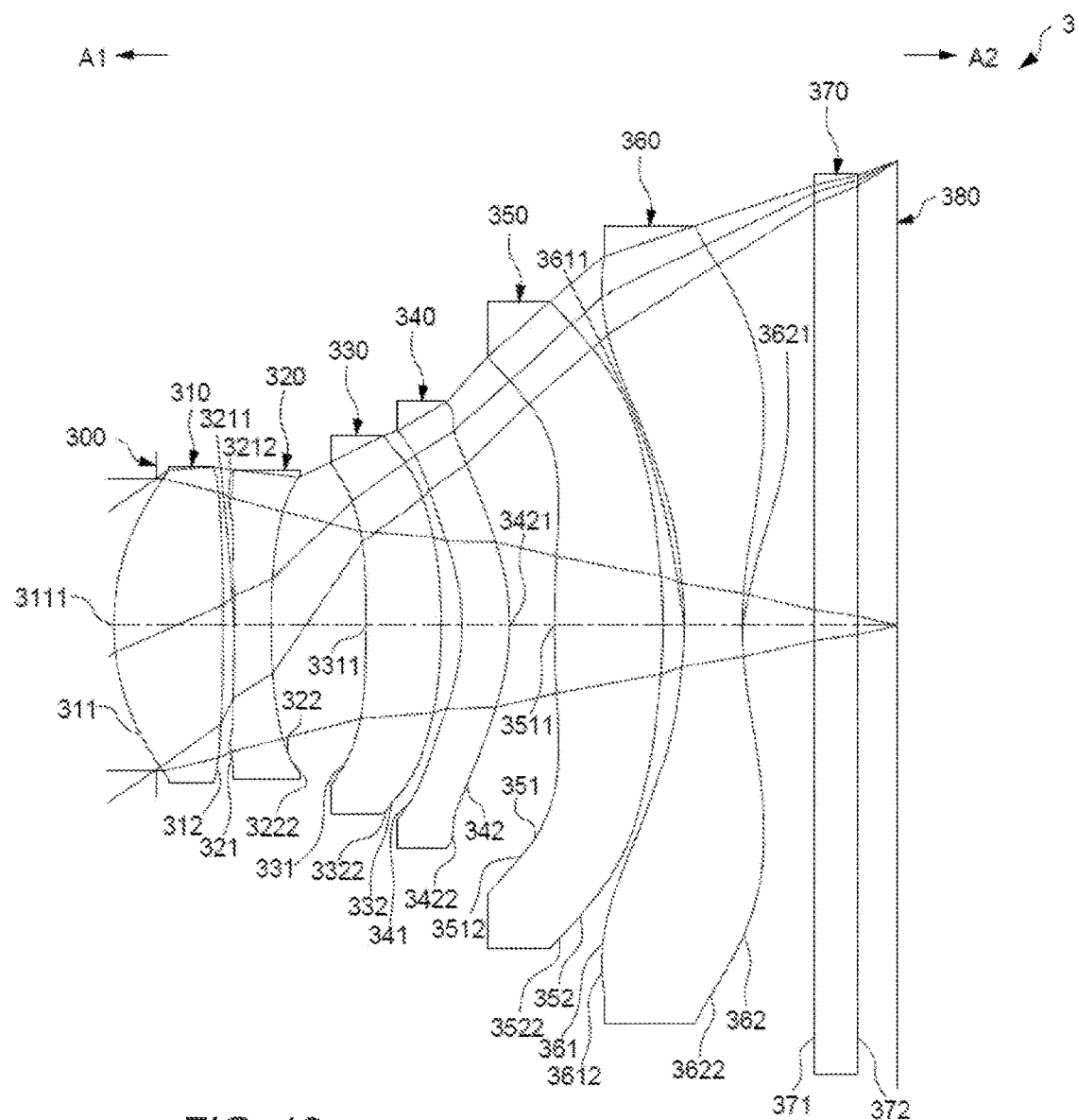
FIG. 10 is a cross-sectional view of a third embodiment of an optical imaging lens having six lens elements according to the present disclosures.
Figure 11:
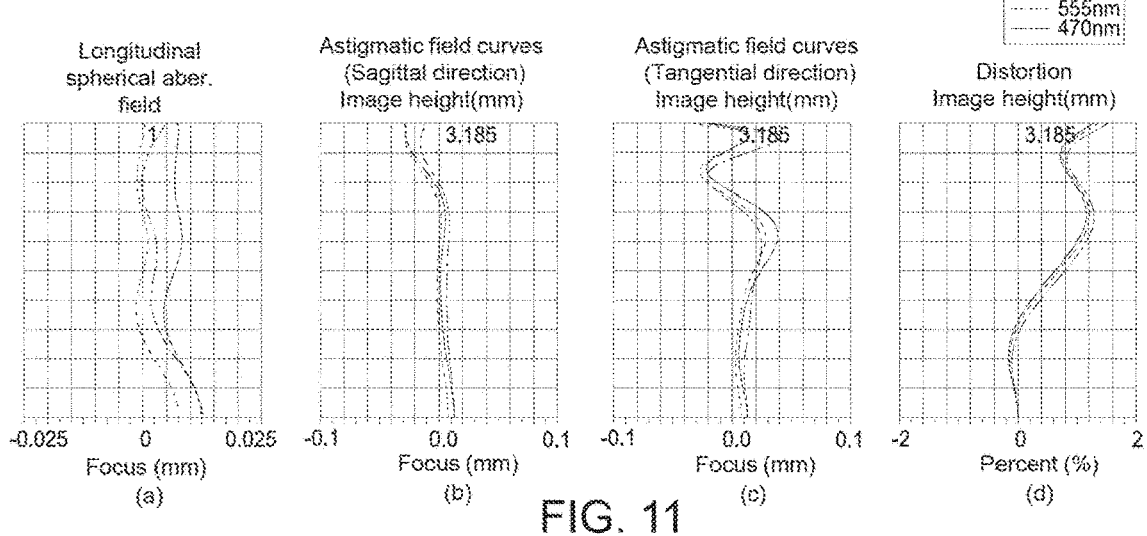
FIG. 11 is a chart of longitudinal spherical aberration and other kinds of optical aberrations of the third embodiment of the optical imaging lens according the present disclosures.

Reference is now made to FIGS. 10-13. FIG. 10 illustrates an example cross-sectional view of an optical imaging lens 3 having six lens elements of the optical imaging lens according to a third example embodiment. FIG. 11 shows example charts of longitudinal spherical aberration and other kinds of optical aberrations of the optical imaging lens 3 according to the third example embodiment. FIG. 12 shows an example table of optical data of each lens element of the optical imaging lens 3 according to the third example embodiment. FIG. 13 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 10, the third embodiment is similar to the first embodiment. The optical imaging lens 3, in an order from an object side A1 to an image side A2, comprises an aperture stop 300, first lens element to sixth lens element 310-360. A filtering unit 370 and an image plane 380 of an image sensor are positioned at the image side A2 of the optical imaging lens 3. The arrangement of the convex or concave surface structures, including the object-side surfaces 311, 341 and image-side surfaces 322, 332, 342, 352, 362, and the refractive power of the lens elements 310, 320, 330, 360 are generally same with the optical imaging lens 1. The difference between the optical imaging lens 1 and the optical imaging lens 3 is the radius of curvature, the values of the central thicknesses of the lens elements 310-360 and the air gaps between the lens elements 310-360 are slight different from the values of the optical imaging lens 1. Besides, the lens elements 310-360 are slight different from these in the first embodiment. More specifically, the image-side surface 312 of the first lens element 310 is a convex surface, the object-side surface 321 of the second lens element 320 comprises a concave portion 3211 in a vicinity of the optical axis and a convex portion 3212 in a vicinity of a periphery of the second lens element 320, the object-side surface 331 of the third lens element 330 is a concave surface, which comprises a concave portion 3311 in a vicinity of the optical axis, the fourth lens element 340 has a negative refractive power, the fifth lens element 350 has a positive refractive power, which comprises a convex portion 3511 in a vicinity of the optical axis and a concave portion 3512 in a vicinity of a periphery of the fifth lens element 350, and the object-side surface 361 of the sixth lens element 360 comprises a concave portion 3611 in a vicinity of the optical axis and a convex portion 3612 in a vicinity of a periphery of the sixth lens element 360.

Please refer to FIG. 12 for the optical characteristics of each lens elements in the optical imaging lens 3 and thicknesses of the air gaps of the present embodiment. The distance from the object-side surface 311 of the first lens element 310 to the image plane 380 along the optical axis is 5.36 mm, and the length of the optical imaging lens 3 is indeed shortened.

As shown in FIGS. 11(a)-11(d), the optical imaging lens 3 of the present embodiment shows great characteristics in longitudinal spherical aberration 11(a), astigmatism in the sagittal direction 11(b), astigmatism in the tangential direction 11(c), and distortion aberration 11(d). Therefore, according to the above illustration, the optical imaging lens of the present embodiment indeed shows great optical performance and the length of the optical imaging lens 3 is effectively shortened.

Figure 14:
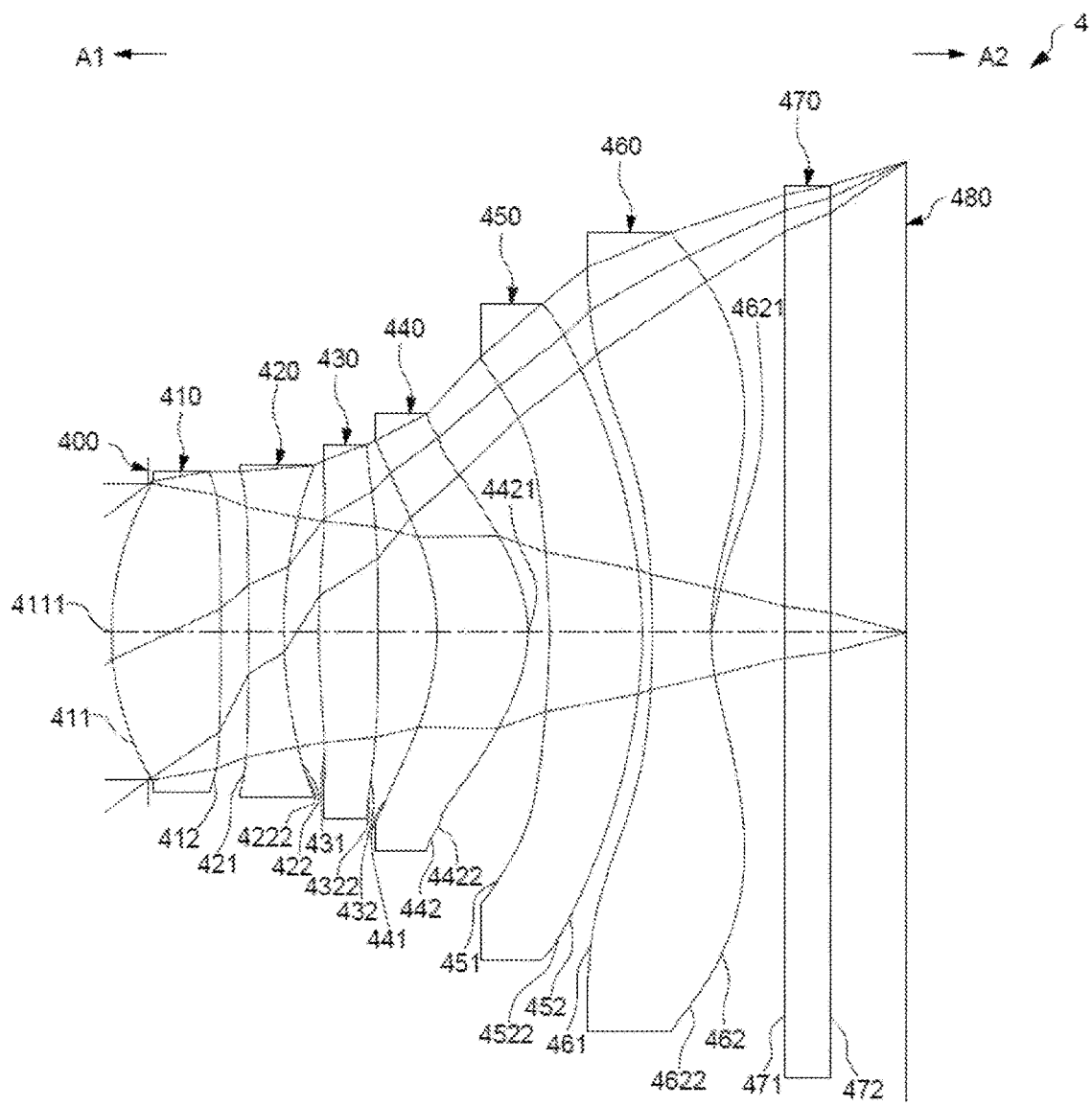
FIG. 14 is a cross-sectional view of a fourth embodiment of an optical imaging lens having six lens elements according to the present disclosures.
Figure 15:
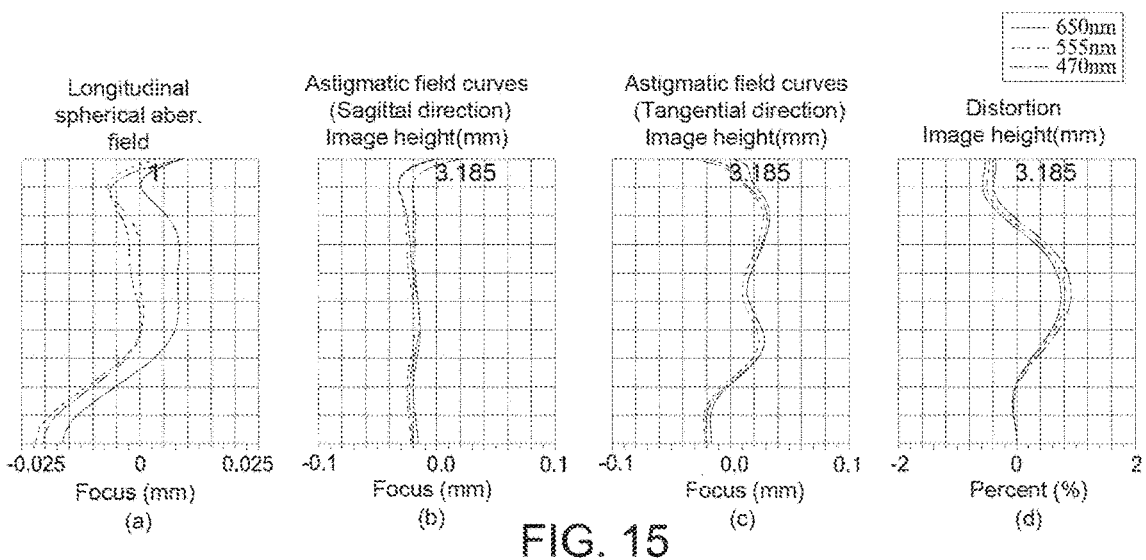
FIG. 15 is a chart of longitudinal spherical aberration and other kinds of optical aberrations of the fourth embodiment of the optical imaging lens according the present disclosures.

Reference is now made to FIGS. 14-17. FIG. 14 illustrates an example cross-sectional view of an optical imaging lens 4 having six lens elements of the optical imaging lens according to a fourth example embodiment. FIG. 15 shows example charts of longitudinal spherical aberration and other kinds of optical aberrations of the optical imaging lens 4 according to the fourth example embodiment. FIG. 16 shows an example table of optical data of each lens element of the optical imaging lens 4 according to the fourth example embodiment. FIG. 17 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 14, the fourth embodiment is similar to the first embodiment. The optical imaging lens 4, in an order from an object side A1 to an image side A2, comprises an aperture stop 400, first lens element to sixth lens element 410-460. A filtering unit 470 and an image plane 480 of an image sensor are positioned at the image side A2 of the optical imaging lens 4. The arrangement of the convex or concave surface structures, including the object-side surfaces 411, 451 and image-side surfaces 422, 432, 442, 452, 462, and the refractive power of the lens elements 410, 420, 430, 440, 460 are generally same with the optical imaging lens 1. The difference between the optical imaging lens 1 and the optical imaging lens 4 is the radius of curvature, the values of the central thicknesses of the lens elements 410-460 and the air gaps between the lens elements 410-460 are slight different from the values of the optical imaging lens 1. Besides, the lens elements 410, 420, 430, 450, 460 are slight different from these in the first embodiment. More specifically, the image-side surface 412 of the first lens element 410 is a convex surface, the object-side surface 421 of the second lens element 420 is a concave surface, the object-side surface 431 is of the third lens element 430 is a convex surface, the fifth lens element 450 has a positive refractive power, and the object-side surface 461 of the sixth lens element 460 is a concave surface.

Please refer to FIG. 16 for the optical characteristics of each lens elements in the optical imaging lens 4 and thicknesses of the air gaps of the present embodiment. The distance from the object-side surface 411 of the first lens element 410 to the image plane 480 along the optical axis is 5.36 mm, and the length of the optical imaging lens 4 is indeed shortened.

As shown in FIGS. 15(a)-15(d), the optical imaging lens 4 of the present embodiment shows great characteristics in longitudinal spherical aberration 15(a), astigmatism in the sagittal direction 15(b), astigmatism in the tangential direction 15(c), and distortion aberration 15(d). Therefore, according to the above illustration, the optical imaging lens of the present embodiment indeed shows great optical performance and the length of the optical imaging lens 4 is effectively shortened.

Figure 18:
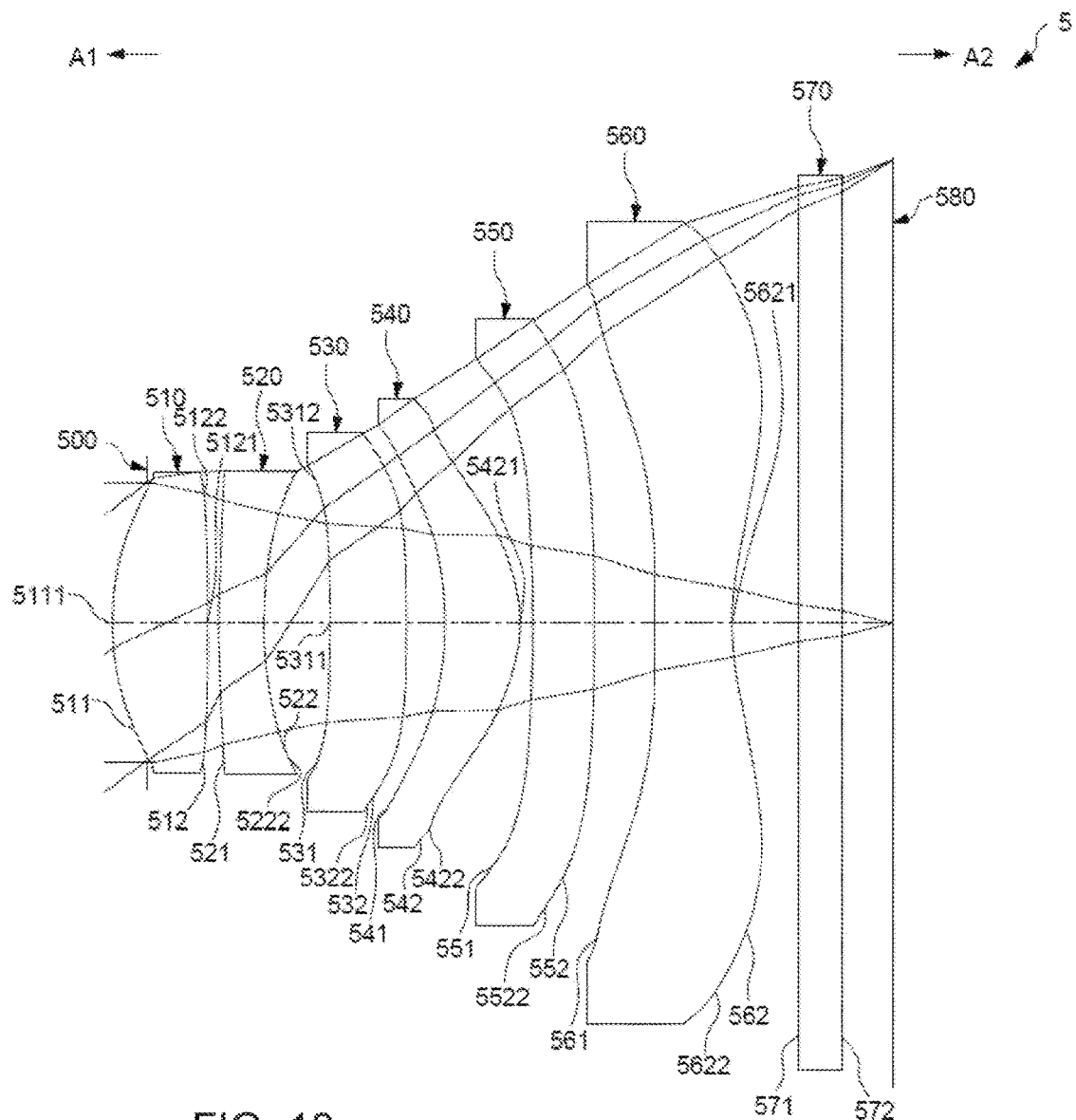
FIG. 18 is a cross-sectional view of a fifth embodiment of an optical imaging lens having six lens elements according to the present disclosures.
Figure 19:
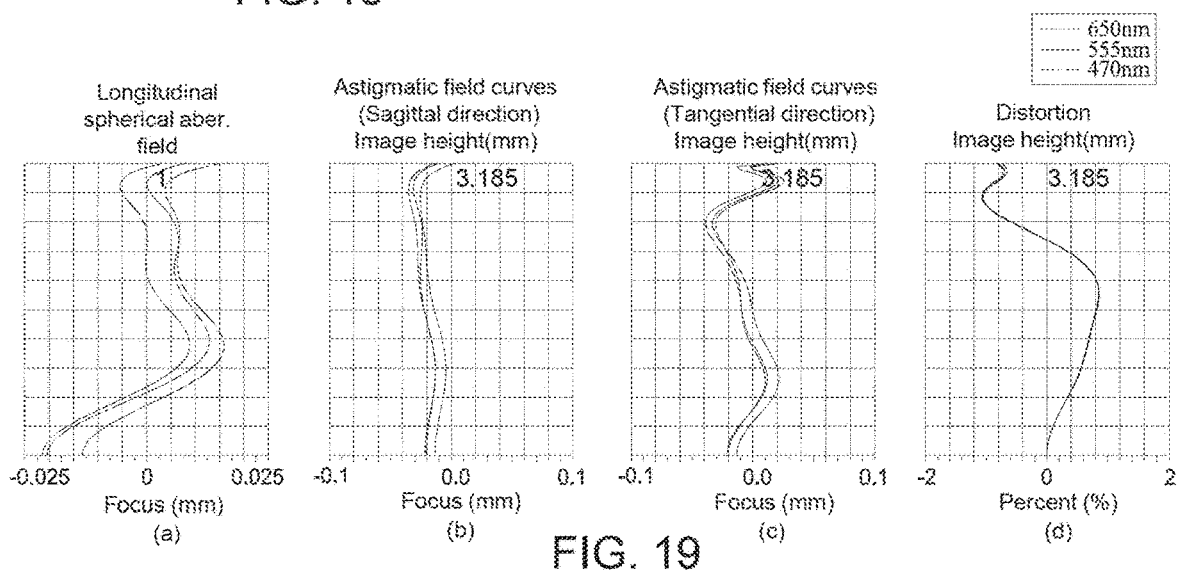
FIG. 19 is a chart of longitudinal spherical aberration and other kinds of optical aberrations of the fifth embodiment of the optical imaging lens according the present disclosures.

Reference is now made to FIGS. 18-21. FIG. 18 illustrates an example cross-sectional view of an optical imaging lens 5 having six lens elements of the optical imaging lens according to a fifth example embodiment. FIG. 19 shows example charts of longitudinal spherical aberration and other kinds of optical aberrations of the optical imaging lens 5 according to the fifth example embodiment. FIG. 20 shows an example table of optical data of each lens element of the optical imaging lens 5 according to the fifth example embodiment. FIG. 21 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 432 for labeling the image-side surface of the third lens element 530, etc.

As shown in FIG. 18, the fifth embodiment is similar to the first embodiment. The optical imaging lens 5, in an order from an object side A1 to an image side A2, comprises an aperture stop 500, first lens element to sixth lens element 510-560. A filtering unit 570 and an image plane 580 of an image sensor are positioned at the image side A2 of the optical imaging lens 5. The arrangement of the convex or concave surface structures, including the object-side surfaces 511, 531, 541, 551 and image-side surfaces 512, 522, 532, 542, 552, 562, and the refractive power of the lens elements 510-560 are generally same with the optical imaging lens 1. The difference between the optical imaging lens 1 and the optical imaging lens 5 is the radius of curvature, the values of the central thicknesses of the lens elements 510-560 and the air gaps between the lens elements 510-560 are slight different from the values of the optical imaging lens 1. Besides, the lens elements 520, 560 are slight different from these in the first embodiment. More specifically, the object-side surface 521 of the second lens element 520 is a convex surface, and the object-side surface 561 of the sixth lens element 560 is a concave surface.

Please refer to FIG. 20 for the optical characteristics of each lens elements in the optical imaging lens 5 and thicknesses of the air gaps of the present embodiment. The distance from the object-side surface 511 of the first lens element 510 to the image plane 580 along the optical axis is 5.36 mm, and the length of the optical imaging lens 5 is indeed shortened.

As shown in FIGS. 19(a)-19(d), the optical imaging lens 5 of the present embodiment shows great characteristics in longitudinal spherical aberration 19(a), astigmatism in the sagittal direction 19(b), astigmatism in the tangential direction 19(c), and distortion aberration 19(d). Therefore, according to the above illustration, the optical imaging lens of the present embodiment indeed shows great optical performance and the length of the optical imaging lens 5 is effectively shortened.

Figure 22:
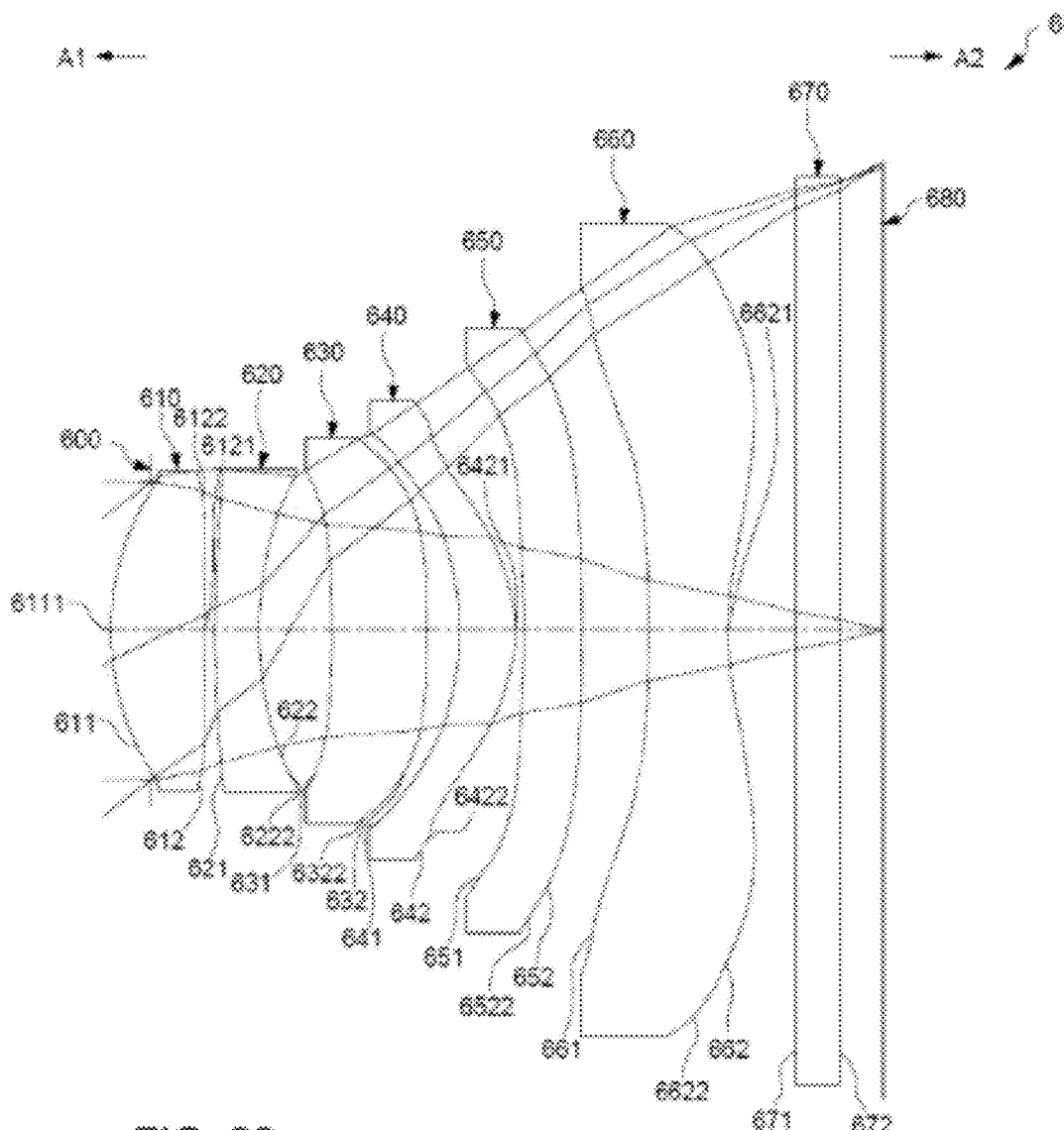
FIG. 22 is a cross-sectional view of a sixth embodiment of an optical imaging lens having six lens elements according to the present disclosures.
Figure 23:
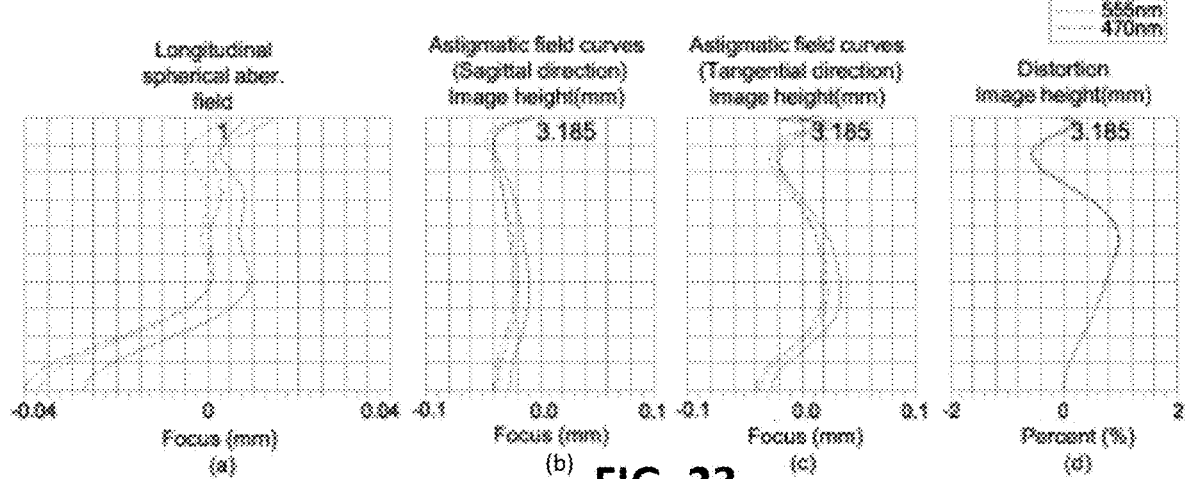
FIG. 23 is a chart of longitudinal spherical aberration and other kinds of optical aberrations of the sixth embodiment of the optical imaging lens according the present disclosures.

Reference is now made to FIGS. 22-25. FIG. 22 illustrates an example cross-sectional view of an optical imaging lens 6 having six lens elements of the optical imaging lens according to a sixth example embodiment. FIG. 23 shows example charts of longitudinal spherical aberration and other kinds of optical aberrations of the optical imaging lens 6 according to the sixth example embodiment. FIG. 24 shows an example table of optical data of each lens element of the optical imaging lens 6 according to the sixth example embodiment. FIG. 25 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 22, the sixth embodiment is similar to the first embodiment. The optical imaging lens 6, in an order from an object side A1 to an image side A2, comprises an aperture stop 600, first lens element to sixth lens element 610-660. A filtering unit 670 and an image plane 680 of an image sensor are positioned at the image side A2 of the optical imaging lens 6. The arrangement of the convex or concave surface structures, including the object-side surfaces 611, 641, 551 and image-side surfaces 612, 622, 632, 642, 652, 662, and the refractive power of the lens elements 610-660 are generally same with the optical imaging lens 1. The difference between the optical imaging lens 1 and the optical imaging lens 6 is the radius of curvature, the values of the central thicknesses of the lens elements 610-660 and the air gaps between the lens elements 610-660 are slight different from the values of the optical imaging lens 1. Besides, the lens elements 620, 630, 660 are slight different from these in the first embodiment. More specifically, the object-side surface 621 of the second lens element 620 is a convex surface, the object-side surface 631 of the third lens element 630 is a concave surface, and the object-side surface 661 of the sixth lens element 660 is a concave surface.

Please refer to FIG. 24 for the optical characteristics of each lens elements in the optical imaging lens 6 and thicknesses of the air gaps of the present embodiment. The distance from the object-side surface 611 of the first lens element 610 to the image plane 680 along the optical axis is 5.21 mm, and the length of the optical imaging lens 6 is indeed shortened.

As shown in FIGS. 23(a)-23(d), the optical imaging lens 6 of the present embodiment shows great characteristics in longitudinal spherical aberration 23(a), astigmatism in the sagittal direction 23(b), astigmatism in the tangential direction 23(c), and distortion aberration 23(d). Therefore, according to the above illustration, the optical imaging lens of the present embodiment indeed shows great optical performance and the length of the optical imaging lens 6 is effectively shortened.

Figure 26:
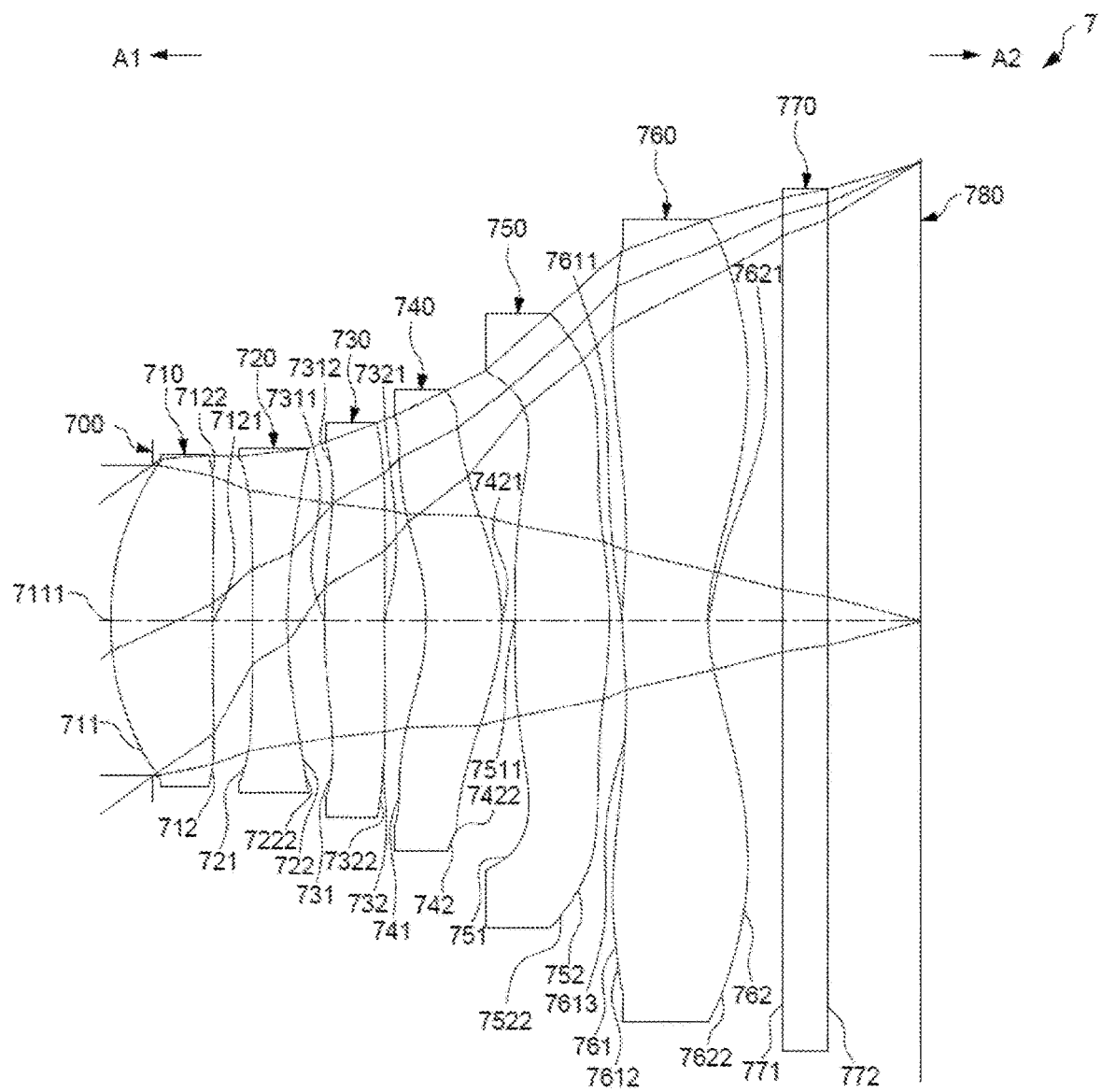
FIG. 26 is a cross-sectional view of a seventh embodiment of an optical imaging lens having six lens elements according to the present disclosures.
Figure 27:
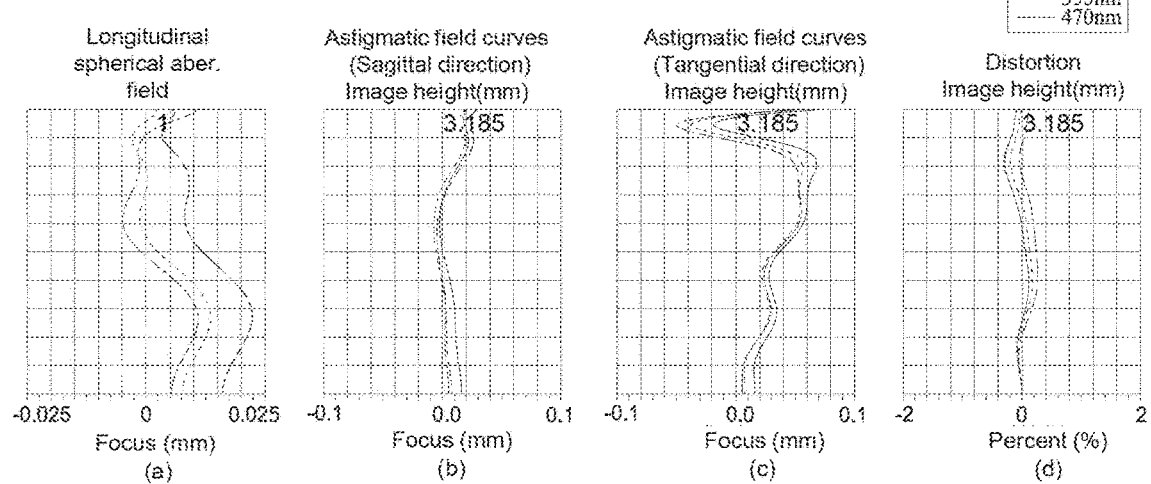
FIG. 27 is a chart of longitudinal spherical aberration and other kinds of optical aberrations of the seventh embodiment of the optical imaging lens according the present disclosures.

Reference is now made to FIGS. 26-29. FIG. 26 illustrates an example cross-sectional view of an optical imaging lens 7 having six lens elements of the optical imaging lens according to a seventh example embodiment. FIG. 27 shows example charts of longitudinal spherical aberration and other kinds of optical aberrations of the optical imaging lens 7 according to the seventh example embodiment. FIG. 28 shows an example table of optical data of each lens element of the optical imaging lens 7 according to the seventh example embodiment. FIG. 29 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 26, the seventh embodiment is similar to the first embodiment. The optical imaging lens 7, in an order from an object side A1 to an image side A2, comprises an aperture stop 700, first lens element to sixth lens element 710-760. A filtering unit 770 and an image plane 780 of an image sensor are positioned at the image side A2 of the optical imaging lens 7. The arrangement of the convex or concave surface structures, including the object-side surfaces 711, 731, 741 and image-side surfaces 712, 722, 742, 752, 762, and the refractive power of the lens elements 710-740, 760 are generally same with the optical imaging lens 1. The difference between the optical imaging lens 1 and the optical imaging lens 7 is the radius of curvature, the values of the central thicknesses of the lens elements 710-760 and the air gaps between the lens elements 710-760 are slight different from the values of the optical imaging lens 1. Besides, the lens elements 720, 730, 750, 760 are slight different from these in the first embodiment. More specifically, the object-side surface 721 of the second lens element 720 is a concave surface, the image-side surface 732 of the third lens element 730 comprises a concave portion 7321 in a vicinity of the optical axis and a convex portion 7322 in a vicinity of a periphery of the third lens element 730, the fifth lens element 750 has a positive refractive power, which comprises a convex portion 7511 in a vicinity of the optical axis, the object-side surface 761 of the sixth lens element 760 comprises a convex portion 7611 in a vicinity of the optical axis, a convex portion 7612 in a vicinity of the a periphery of the sixth lens element 760, and a concave portion 7613 between a vicinity of the optical axis and a vicinity of a periphery of the sixth lens element 760.

Please refer to FIG. 28 for the optical characteristics of each lens elements in the optical imaging lens 7 and thicknesses of the air gaps of the present embodiment. The distance from the object-side surface 711 of the first lens element 710 to the image plane 780 along the optical axis is 5.42 mm, and the length of the optical imaging lens 7 is indeed shortened.

As shown in FIGS. 27(a)-27(d), the optical imaging lens 7 of the present embodiment shows great characteristics in longitudinal spherical aberration 27(a), astigmatism in the sagittal direction 27(b), astigmatism in the tangential direction 27(c), and distortion aberration 27(d). Therefore, according to the above illustration, the optical imaging lens of the present embodiment indeed shows great optical performance and the length of the optical imaging lens 7 is effectively shortened.

Please refer to FIG. 30 which shows the values of EFL/CT3, TL/CT6, $$\frac{EFL}{CT2+AC56}, \frac{AC23+CT3+AC34}{CT3}, \frac{AAG}{AC23+AC34},$$

$$\frac{AC23+AC34}{AC12+AC45+AC56}, \frac{EFL}{CT4+CT5},$$

ALT/CT6, $$\frac{EFL}{CT6+AC56}, \frac{CT4+CT5}{CT2}, \text{ and } \frac{TL}{CT2+AC56}$$

of all seven embodiments, and it is clear that the optical imaging lens of the present invention satisfy the Equations (1) and/or (1'), (2), (3), (4), (5), (6), (7), (8), (9), (10) or (11).

Please refer to FIG. 31, which shows an example structural view of a first embodiment of mobile device 20 applying an aforesaid optical imaging lens. The mobile device 20 comprises a housing 21 and a photography module 22 positioned in the housing 21. An example of the mobile device 20 may be, but is not limited to, a mobile phone.

As shown in FIG. 31, the photography module 22 may comprise an aforesaid optical imaging lens, for example the optical imaging lens 1 of the first embodiment, a lens barrel 23 for positioning the optical imaging lens 1, a module housing unit 24 for positioning the lens barrel 23, a substrate 182 for positioning the module housing unit 24, and an image sensor 181 which is positioned at an image side of the optical imaging lens 1. The image plane 180 is formed on the image sensor 181.

In some other example embodiments, the structure of the filtering unit 170 may be omitted. In some example embodiments, the housing 21, the lens barrel 23, and/or the module housing unit 24 may be integrated into a single component or assembled by multiple components. In some example embodiments, the image sensor 181 used in the present embodiment is directly attached to a substrate 182 in the form of a chip on board (COB) package, and such package is different from traditional chip scale packages (CSP) since COB package does not require a cover glass before the image sensor 181 in the optical imaging lens 1. Aforesaid exemplary embodiments are not limited to this package type and could be selectively incorporated in other described embodiments.

The six lens elements 110, 120, 130, 140, 150, 160 are positioned in the lens barrel 23 in the way of separated by an air gap between any two adjacent lens elements.

The module housing unit 24 comprises a seat element 2401 for positioning the lens barrel 23 and an image sensor backseat 2406, in which the image sensor backseat 2406 is not necessary in other embodiment. The lens barrel 23 and the seat element 2401 are positioned along a same axis I-I', and the lens barrel 23 is positioned inside the seat element 2401.

Because the length of the optical imaging lens 1 is merely 5.27 (mm), the size of the mobile device 20 may be quite small. Therefore, the embodiments described herein meet the market demand for smaller sized product designs.

Reference is now made to FIG. 32, which shows another structural view of a second embodiment of mobile device 20' applying the aforesaid optical imaging lens 1. One difference between the mobile device 20' and the mobile device 20 may be the seat element 2401 further comprises a first lens seat 2402, a second lens seat 2403, a coil 2404, and a magnetic unit 2405. The first lens seat 2402, which is close to the outside of the lens barrel 23, and the lens barrel 23 are positioned along an axis II'. The second lens seat 2403 is positioned along the axis II' and around the outside of the first lens seat 2402. The coil 2404 is positioned between the outside of the first lens seat 2402 and the inside of the second lens seat 2403. The magnetic unit 2405 is positioned between the outside of the coil 2404 and the inside of the second lens seat 2403. The end facing to the image side of the image sensor backseat 2406 is close to the second lens seat 2403.

The lens barrel 23 and the optical imaging lens 1 positioned therein are driven by the first lens seat 2402 to move along the axis II'. The rest structure of the mobile device 20' is similar to the mobile device 20.

Similarly, because the length of the optical imaging lens 5.27 mm, is shortened, the mobile device 20' may be designed with a smaller size and meanwhile good optical performance is still provided. Therefore, the present embodiment meets the market demand for smaller sized product designs, and maintains good optical characteristics and image quality. Accordingly, the present embodiment not only reduces raw material amount of housing for economic benefits, but also meets smaller sized product design trend and consumer demand.

According to above illustration, it is clear that the mobile device and the optical imaging lens thereof in example embodiments, through controlling ratio of at least one central thickness of lens element to a sum of all air gaps along the optical axis between six lens elements in a predetermined range, and incorporated with detail structure and/or reflection power of the lens elements, the length of the optical imaging lens is effectively shortened and meanwhile good optical characters are still provided.

While various embodiments in accordance with the disclosed principles have been described above, it should be understood that they have been presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, disposed sequentially from an object side to an image side, comprising first, second, third, fourth, fifth, and sixth lens elements, each of said lens elements having an object-side surface facing toward said object side and an image-side surface facing toward said image side, wherein:
    said object-side surface of said second lens element comprises a convex portion in a vicinity of a periphery of said second lens element;
    said third lens element has positive refractive power and said image-side surface of said third lens element comprises a convex portion in a vicinity of a periphery of said third lens element;
    said image-side surface of said fifth lens element comprises a convex portion in a vicinity of an optical axis;
    said image-side surface of said sixth lens element comprises a concave portion in a vicinity of an optical axis and a convex portion in a vicinity of a periphery of said sixth lens element; and
    said optical imaging lens as a whole has only the six lens elements,
    wherein a distance from said object-side surface of said first lens element to said image-side surface of said sixth lens element is TL, a central thickness of said sixth lens element along the optical axis is CT6, and TL and CT6 satisfy the equation:

$$7.60 \le \frac{TL}{CT6}.$$

2. The optical imaging lens according to claim 1, wherein the sum of the thickness of all six lens elements along the optical axis is defined as ALT, and ALT and CT6 satisfy the equation:

$$5.50 \le \frac{ALT}{CT6}.$$

3. The optical imaging lens according to claim 1, wherein a central thickness of said second lens element is CT2, a central thickness of said fourth lens element is CT4, a central thickness of said fifth lens element is CT5, and CT2, CT4, and CT5 satisfy the equation:

$$2.80 \le \frac{CT4 + CT5}{CT2}.$$

4. The optical imaging lens according to claim 1, wherein an effective focal length of said optical imaging lens is EFL, a central thickness of said fourth lens element along the optical axis is CT4, a central thickness of said fifth lens element along the optical axis is CT5, and EFL, CT4, and CT5 satisfy the equation:

$$\frac{EFL}{CT4 + CT5} \le 5.40.$$

5. The optical imaging lens according to claim 1, wherein an effective focal length of said optical imaging lens is EFL, a central thickness of said third lens element along the optical axis is CT3, and EFL and CT3 satisfy the equation:

$$6.00 \le \frac{EFL}{CT3}.$$

6. The optical imaging lens according to claim 1, wherein a central thickness of said first lens element is greater than a central thickness of said sixth lens element.

7. The optical imaging lens according to claim 1, wherein an air gap between said fifth lens element and said sixth lens element is greater than an air gap between said first lens element and said second lens element.

8. An optical imaging lens, disposed sequentially from an object side to an image side, comprising first, second, third, fourth, fifth, and sixth lens elements, each of said lens elements having an object-side surface facing toward said object side and an image-side surface facing toward said image side, wherein:
said image-side surface of said first lens element comprises a concave portion in a vicinity of an optical axis;
said image-side surface of said second lens element comprises a concave portion in a vicinity of a periphery of said second lens element;
said third lens element has positive refractive power and said image-side surface of said third lens element comprises a convex portion in a vicinity of a periphery of said third lens element;
said image-side surface of said fifth lens element comprises a convex portion in a vicinity of an optical axis;
said image-side surface of said sixth lens element comprises a concave portion in a vicinity of an optical axis and a convex portion in a vicinity of a periphery of said sixth lens element; and
said optical imaging lens as a whole has only the six lens elements.

9. The optical imaging lens according to claim 8, wherein the sum of the thickness of all six lens elements along the optical axis is defined as ALT, a central thickness of said sixth lens element along the optical axis is CT6, and ALT and CT6 satisfy the equation:

$$5.50 \le \frac{ALT}{CT6}.$$

10. The optical imaging lens according to claim 8, wherein a central thickness of said second lens element is CT2, a central thickness of said fourth lens element is CT4, a central thickness of said fifth lens element is CT5, and CT2, CT4, and CT5 satisfy the equation:

$$2.80 \le \frac{CT4 + CT5}{CT2}.$$

11. The optical imaging lens according to claim 8, wherein an effective focal length of said optical imaging lens is EFL, a central thickness of said fourth lens element along the optical axis is CT4, a central thickness of said fifth lens element along the optical axis is CT5, and EFL, CT4, and CT5 satisfy the equation:

$$\frac{EFL}{CT4 + CT5} \le 5.40.$$

12. The optical imaging lens according to claim 8, wherein a distance from said object-side surface of said first lens element to said image-side surface of said sixth lens element is TL, a central thickness of said second lens element is CT2, an air gap between said fifth lens element and said sixth lens element is AC56, and TL, CT2, and AC56 satisfy the equation:

$$5.50 \le \frac{TL}{CT2 + AC56}.$$

13. The optical imaging lens according to claim 8, wherein a central thickness of said fifth lens element is greater than a central thickness of said sixth lens element.

14. The optical imaging lens according to claim 8, wherein an air gap between said fifth lens element and said sixth lens element is greater than an air gap between said fourth lens element and said fifth lens element.

15. An optical imaging lens, disposed sequentially from an object side to an image side, comprising first, second, third, fourth, fifth, and sixth lens elements, each of said lens elements having an object-side surface facing toward said object side and an image-side surface facing toward said image side, wherein:
said first lens element has positive refractive power and said image-side surface of said first lens element comprises a concave portion in a vicinity of an optical axis;
said second lens element has negative refractive power and said image-side surface of said second lens element comprises a concave portion in a vicinity of a periphery of said second lens element;
said third lens element has positive refractive power and said image-side surface of said third lens element comprises a convex portion in a vicinity of a periphery of said third lens element;
said image-side surface of said fourth lens element comprises a convex portion in a vicinity of a periphery of said fourth lens element;
said sixth lens element has negative refractive power; and
said optical imaging lens as a whole has only the six lens elements.

16. The optical imaging lens according to claim 15, wherein the sum of the thickness of all six lens elements along the optical axis is defined as ALT, a central thickness of said sixth lens element along the optical axis is CT6, and ALT and CT6 satisfy the equation:

$$5.50 \le \frac{ALT}{CT6}.$$

17. The optical imaging lens according to claim 15, wherein a central thickness of said second lens element is CT2, a central thickness of said fourth lens element is CT4, a central thickness of said fifth lens element is CT5, and CT2, CT4, and CT5 satisfy the equation:

$$2.80 \le \frac{CT4 + CT5}{CT2}.$$

18. The optical imaging lens according to claim 15, wherein an effective focal length of said optical imaging lens is EFL, a central thickness of said fourth lens element along the optical axis is CT4, a central thickness of said fifth lens element along the optical axis is CT5, and EFL, CT4, and CT5 satisfy the equation:

$$\frac{EFL}{CT4 + CT5} \le 5.40.$$

19. The optical imaging lens according to claim 15, wherein a distance from said object-side surface of said first lens element to said image-side surface of said sixth lens element is TL, a central thickness of said sixth lens element along the optical axis is CT6, and TL and CT6 satisfy the equation:

$$7.60 \leq \frac{TL}{CT6}.$$

20. The optical imaging lens according to claim 15, wherein an Abbe number of said fourth lens element is greater than an Abbe number of said second lens element.

* * * * *